(12) United States Patent
Belovich

(10) Patent No.: US 8,924,928 B1
(45) Date of Patent: Dec. 30, 2014

(54) RULE-BASED, RUN-TIME-ALTERABLE, CLIENT-AGNOSTIC CLIENT-SERVER SYSTEM

(76) Inventor: Steven G. Belovich, Hinckley, OH (US)

( * ) Notice: Subject to any disclaimer, the term of this patent is extended or adjusted under 35 U.S.C. 154(b) by 819 days.

(21) Appl. No.: 12/827,447

(22) Filed: Jun. 30, 2010

Related U.S. Application Data

(63) Continuation of application No. 12/018,017, filed on Jan. 22, 2008, which is a continuation-in-part of application No. 10/247,731, filed on Sep. 19, 2002, now Pat. No. 7,322,028.

(60) Provisional application No. 60/323,575, filed on Sep. 19, 2001.

(51) Int. Cl.
*G06F 9/44* (2006.01)

(52) U.S. Cl.
USPC ........... 717/117; 717/111; 717/126; 717/140; 706/45; 706/46; 706/47

(58) Field of Classification Search
None
See application file for complete search history.

(56) References Cited

U.S. PATENT DOCUMENTS

| | | | | |
|---|---|---|---|---|
| 4,837,735 A * | 6/1989 | Allen et al. | ....................... | 706/10 |
| 4,918,620 A * | 4/1990 | Ulug | ............................... | 706/59 |
| 5,263,127 A * | 11/1993 | Barabash et al. | ................ | 706/48 |
| 5,412,756 A * | 5/1995 | Bauman et al. | .................. | 706/45 |
| 5,442,792 A * | 8/1995 | Chun | ............................ | 717/155 |
| 5,475,587 A * | 12/1995 | Anick et al. | ....................... | 704/9 |
| 5,815,713 A * | 9/1998 | Sanders | ......................... | 717/106 |
| 5,832,467 A * | 11/1998 | Wavish | ............................ | 706/13 |
| 5,875,440 A * | 2/1999 | Cooperman et al. | ............. | 706/50 |
| 5,999,179 A * | 12/1999 | Kekic et al. | ..................... | 715/734 |
| 6,006,035 A * | 12/1999 | Nabahi | ........................... | 717/175 |
| 6,219,831 B1 * | 4/2001 | Ono | ................................. | 717/136 |
| 6,266,811 B1 * | 7/2001 | Nabahi | .......................... | 717/174 |
| 7,191,163 B2 * | 3/2007 | Herrera et al. | ................... | 706/47 |
| 7,203,744 B1 * | 4/2007 | Parekh et al. | ................... | 709/223 |
| 7,356,522 B2 * | 4/2008 | Herrera et al. | .................... | 706/47 |
| 2002/0151304 A1 * | 10/2002 | Hogan | ............................ | 455/436 |
| 2006/0041879 A1 * | 2/2006 | Bower et al. | ................... | 717/162 |
| 2006/0075396 A1 * | 4/2006 | Surasinghe | .................... | 717/168 |
| 2006/0184516 A1 * | 8/2006 | Ellis | ................................... | 707/3 |

* cited by examiner

*Primary Examiner* — Chameli Das
(74) *Attorney, Agent, or Firm* — W. Scott Harders; Brennan, Manna & Diamond LLC

(57) ABSTRACT

A machine is disclosed in data communication with at least one remote computing device configured as a user interface, for example. The machine may include first logic to process non-compiled, non-linked rules providing desired functionality on a remote computing device upon the occurrence of an event. The machine may also include second logic to selectively implement an authorized rule change changing a non-compiled, non-linked rule and storing the changed rule in storage. Changing the non-compiled, non-linked rule may be accomplished in run-time and provide changed functionality on the remote computing device upon an event.

20 Claims, 11 Drawing Sheets

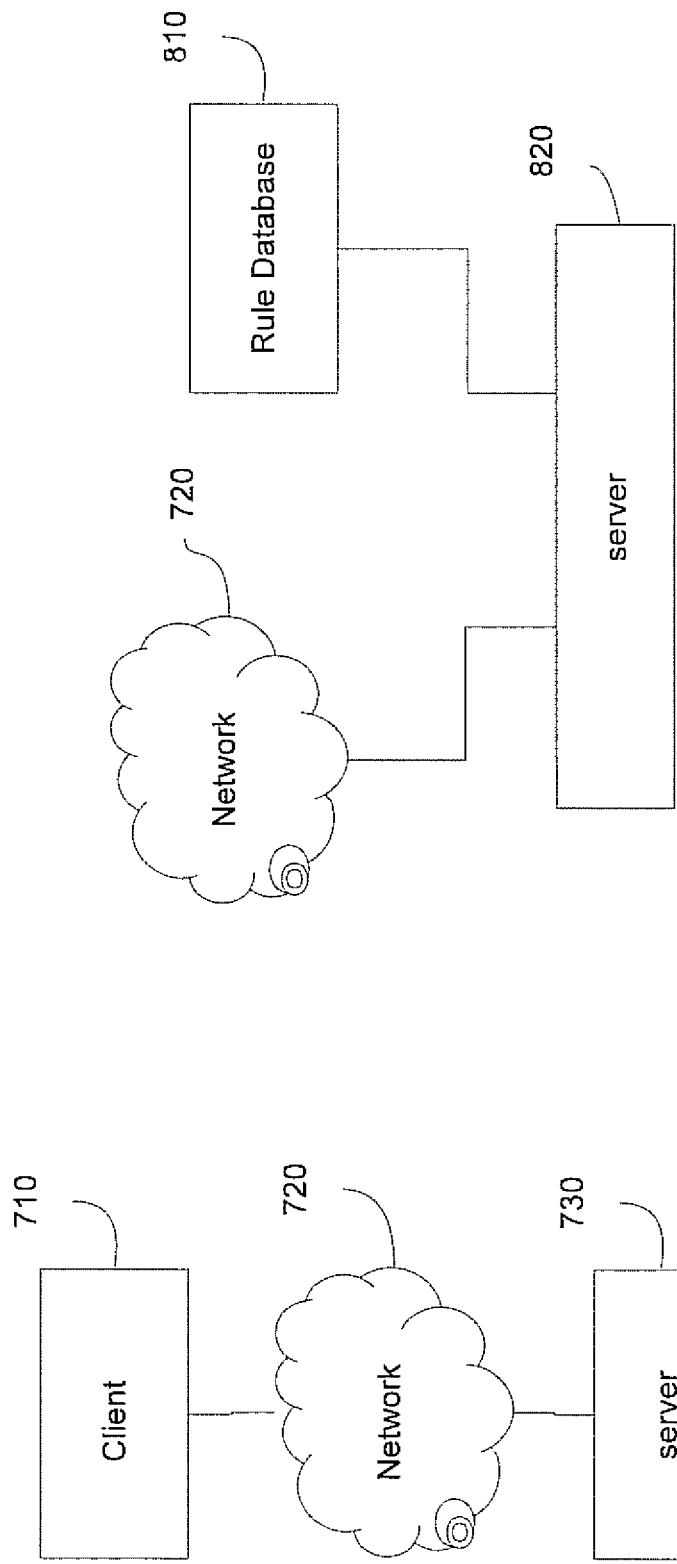

RULE-BASED, RUN-TIME-ALTERABLE, CLIENT-AGNOSTIC CLIENT-SERVER SYSTEM

CROSS-REFERENCE TO RELATED APPLICATIONS

This application claims priority to and is a continuation of U.S. application Ser. No. 12/018,017, filed Jan. 22, 2008, pending, which is a continuation in part of U.S. application Ser. No. 10/247,731, now U.S. Pat. No. 7,322,028, filed Sep. 19, 2002, which claims the benefit of U.S. Provisional Application No. 60/323,575 filed Sep. 19, 2001.

FIELD

This application relates in general to software systems, and in particular to an architecture configured to provide an event auditing client server software arrangement.

BACKGROUND

Recently, a large variety of new computer-based business and manufacturing automation systems have been introduced. New hardware products are coming out at an incredible rate, while new software products are being introduced even more quickly. Although the data analysis, information management and control capabilities brought by these new products have certainly been of great benefit, the products, when installed and configured, seldom meet expectations at anywhere near the projected costs.

One significant problem is constant, never-ending software development. Although the capabilities and features of software packages have increased greatly in the last ten (10) years, the need for programmers and programming services has grown even more rapidly. This is true across various types of software including general packages and those directed towards business and manufacturing automation. The successful system integration of common software packages invariably demands that a great deal of custom code be designed, written and debugged, which is a costly and error-prone activity.

Another emerging and largely unanticipated problem is cyber attacks and other malicious software. Nearly all software systems were designed assuming a benign operating environment in which program operation would proceed without interference. Unfortunately, this assumption is violated nearly every day, especially since Sep. 11, 2001. Cyber attacks are increasing in frequency and in severity and vast majority existing software systems are unable to operate properly under such conditions.

"Stop-gap" measures such as firewalls and anti-virus software have been employed to provide some degree of protection. However, none of these techniques and technologies can provide 100% protection. Firewalls have been successfully breached by teenagers and anti-virus software only works for known virus instances. Software skill sets have migrated across the globe with the natural consequence of a dramatic rise in the sophistication of malicious software used in cyber attacks. This situation is expected to worsen as the software tools and technologies available to the attackers rivals those available to the defenders.

Systems integration firms and end users are devoting an ever-increasing fraction of their budgets to cyber defense, software design, programming and verification. Pedestrian software activities such as configuring a firewall, creating custom menus, formatting dialog boxes, creating custom displays and the like can usually be done via traditional "point-and-click" or by at most editing a script file. Unfortunately, this traditional level of flexibility is woefully inadequate to meet end users' changing needs in a timely and cost-effective manner.

More sophisticated software efforts, such as implementing a new business rule, conforming to new data analysis & reporting regulations, increasing system security, executing a custom menu option, and the like invariably requires significant custom code development in a computer language such as Visual Basic, Visual C or Java. Additionally, to obtain the desired level of end-user functionality, still more custom code must be designed, written and debugged. Further, if the original application was not architected well, it may not even be possible to add this new functionality without extensively rewriting it. The cost of these software design and programming efforts is significant and is considerably greater than the cost of the original out-of-the-box software package. FIG. 1 illustrates a typical cost breakdown of implementing a business or manufacturing automation software project.

Nearly all companies maintain Information Technology (IT) departments to handle software installations, upgrades, and custom code development. Significant fractions of companies' operating budgets are allocated to IT departments for these tasks. Companies who are not even in the software business must still make large financial and personnel investments in Information Technology. Thus, both human and capital resources are inefficiently expended on tasks far outside the companies' area of core competency and industry. Cyber defense and software security efforts exacerbate this situation and are beginning to consume a significant fraction of both corporate and government resources.

New operating systems and platform products are introduced into the market at a phenomenal rate. This rapid change often requires application software to be redesigned just to continue to operate with the new computer platform, operating system and/or other application. Thus, many companies' software development efforts and expenses are now driven by external market forces that are completely unrelated to their core business or market. Unfortunately, money spent on this type of software development may not even directly improve productivity, product quality or increase sales. It may even negatively impact profitability and cash flow. The same is true for cyber defense and software security efforts. These activities negatively impact cash flow because they are required for successful business operation yet they do not have direct business benefit in terms of sales, product quality improvement or cost reduction.

A new method and apparatus is thus needed which overcomes the above-mentioned problems and others. This new method and apparatus comprises (or represents) a better way to do the two essential software tasks: 1) efficiently and rapidly describe what you want the computer to do, and 2) quickly and reliably get the computer to do it.

SUMMARY

In accordance with an aspect of this description, a single software application may provide desired functionality to users in a client-server architecture irrespective of the operating system (O/S) operating any computer so architected.

In accordance with another aspect of this description, at least one computer in a client-server architecture may be secure. The server platform and operating system can be configured to implement the "Reference Monitor" software security architecture that is well-known in the art to provide a "Trusted Computing Base" (TCB). The reference monitor may enforce a predetermined (and adjustable) system security policy by controlling the access of every subject or user to every object or rule in the software system. The reference monitor may maintain an access control list (ACL) which determines which subjects or users have access to which objects or rules and the manner of allowed access. Subjects can also be active entities, user processes, etc. while objects can be files, directories, passive data repositories, etc. The reference monitor also may maintain a tamper proof audit trail so that security-related events can be tracked and reported. At least one computer may use this TCB as a platform to help ensure its security.

In accordance with another aspect of this description, the software configuration process corresponds to a software development process that eliminates or significantly reduces the amount of coding required to create a new application or to modify an existing application. The software configuration process may specify "rules" that can then be executed by so-called "planar code" which also permits the introduction of new or revised rules at any time (including run-time) without the need to write, compile, link, test and debug new software code.

In accordance with another aspect of this description, the software system may be architected so that it standardizes on multi-vendor-controlled interfaces between major elements—rather than standardizing on vendor-specific, client operating systems, Application Programmer Interfaces (APIs) and other rapidly changing items. Multi-vendor-controlled interfaces are those interfaces that cannot be changed by one software vendor alone. Rather, an interface change requires the express consent of multiple and competing software vendors in the marketplace. Examples of multi-vendor-controlled interfaces/standards are SQL for database access and TCP/IP for network communication. Examples of single-vendor-controlled interfaces/standards are OLE for Object Linking and Embedding for inter-application data object sharing, and NetBUI and NetDDE for network communication, all of which are strictly controlled by Microsoft. Further, these single-vendor-controlled interfaces/standards only apply to Microsoft operating systems and Wintel platforms. Experience has shown that multi-vendor-controlled interfaces/standards have a much longer lifetime than any other type of software "standard" and that they are much more universal in their usage. Standardizing on these types of interfaces—and avoiding the ephemeral, single-vendor-controlled interfaces, is an aspect of the invention to help assure that systems constructed in accord with the teachings herein will have a long operational lifetime.

In accordance with another aspect of this description, the single application that provides the functionality to the end user may be immune to desktop computer viruses or resistant. Authentication logic may be configured to ensure that virus script files, malicious desktop executable images, time bombs and the like cannot authenticate execute on the server or interfere with the proper operation of the single application in any way.

In accordance with another aspect of this description, a method is provided whereby the precise functionality implemented by the single application can be altered or enhanced in real time and delivered to the client machines irrespective of the client machine's O/S.

In accordance with another aspect of this description, the software system can often provide the user-specific functionality without writing new code. The software system may be configured to provide functionality, as determined by rules. Note that this transformation process is one of functionality only. The software system's code itself need not change. The configuration process is flexible enough to change the functionality provided by this single application, including displays, menu options, database tables and structures, data analysis processes, operating rules, reports, graphic objects, and the like. In short, the system can provide nearly any data acquisition, analysis, presentation and archiving functionality by the configuration process.

In accordance with another aspect of this description, the rule based flexibility of the system enables functional behavior that may be configured as an industry-specific software products. The system, when configured with rules "A" may function as industry-specific software product "A". The same system, when combined with rules "B," may function as industry-specific software product "B". In this manner, the system may be configured to service varied industries meeting specific functional requirements.

In accordance with another aspect of this description, the ability of the system to selectively become any of a variety of industry-specific software products may significantly reduce the amount of software development effort and support for this set of software products. Traditionally, one software engineering team and one technical support team would be required for each software product a company makes. A total of "N" software products would require "N" software engineering teams and "N" technical support teams. The system may reduce support needs to only one software engineering team and technical support team since there can be only one application. Systems configured under the teachings herein may enjoy an N-to-1 reduction in the amount of staff and expense needed for software development and technical support.

In accordance with another aspect of this description, a computer may communicate via at least one network and may provide functionality with client computers of any kind, including mainframes, midrange machines, traditional desktop platforms (PCs), laptops, so-called "palm tops" or "Personal Digital Assistants" (PDAs) and all varieties portable and wireless devices.

In accordance with another aspect of this description, a system may provide desired functionality to users regardless of the computing environments (e.g. Linux, Windows, Sun O/S, Unix, Palm, Blackberry and the like), the connection mode to the server (e.g. networked, serial, wireless and the like), and the mix of various client operating systems. The system may provide functionality in part by an enabling architecture which is independent of quickly changing code (client or operating systems) and their associated application program interfaces.

In accordance with another aspect of this description, a system may quickly adapt to new client machine technologies, operating systems, and hardware devices. The system may not require re-design to do this. During a communication process with a client, a translation may convert the communicated items to/from a form that the client machine can understand. This translation may be done dynamically, on-the-fly during any communication with the client. When a new client machine is introduced, the system may only require a translation module or rule set that may convert communicated items to/from a form that the new client understands. This translation need not impact either the operation or the functionality of the single application in any way. Thus, the system may be designed in a client-independent fashion and may not need client-specific items in its architecture. This feature may preserve the substantial investment in software purchase and configuration effort because the system (performing industry-specific functions for an end user) may take nearly immediate advantage of new technology without undue expense and without significant interruption in service. This feature may also provide a significant improvement in the state-of-the-art, which requires that an existing application be redesigned/reworked to work with a new client operating system and/or platform.

In accordance with another aspect of this description, the system can be configured to provide client-specific functionality which can be implemented and maintained by a single support team.

In accordance with another aspect of this description, the single executable application can be configured to act as a standalone software product, or tailored to any desired industry vertical market (e.g., health care, pharmacy management, pharmaceutical production, chemical processing, manufacturing, etc.). The ease of the configuration process and the lack of any code development may make it economically feasible to create entire families of industry-specific and market-specific software products without a corresponding increase in development time, or costly development staff. These new products may employ the same system, differing only in the configuration information or rules.

In accordance with another aspect of this description, a method and system are provided that may provide protection from intentional or unintentional client machine flaws, O/S flaws, errors or omissions, desktop viruses, and other malicious software attacks. This protection may be provided by architecturally segregating, critical functional areas of the application and moving them to protected areas and auditing rules for authorization.

In accordance with another aspect of this description, a method and system are provided that may allow the system to be reconfigured to alter its functionality while it is running and without interrupting its current operation. Further, the altered functionality may be available to all client machines without the need for installing additional software, rebooting or reworking in any way.

Other aspects will occur to those skilled in the art upon reading and understanding the following detailed description.

BRIEF DESCRIPTION OF THE DRAWINGS

The teachings here may take physical form in various parts and arrangements of parts, and in various steps and arrangements of steps. The drawings are only for purposes of illustrating exemplary embodiments including the presently preferred embodiment and are not to be construed as limiting the invention. In the accompanying drawings which are incorporated in and constitute a part of the specification, embodiments of the invention are illustrated, which, together with a general description given above, and the detailed description given below, serve to describe the example embodiments of the system and method. It will be appreciated that the illustrated boundaries of elements (e.g. boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vice versa.

FIG. 11 shows how the client part and the server part communicate using the "network cloud";

FIG. 12 shows the Rule database and how it governs the operation of the server part, including the "Business Logic" and the "Program Response" sections; and, FIG. 13 shows one possible structure for the Rule Processor (RP), including the event loop, the action loop, audit processing and security sections.

DETAILED DESCRIPTION

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, a script file (e.g., Perl, JAVA, XML) or other type of executable instructions. It will be appreciated by one of ordinary skill in the art that the form of software is dependent on, for example, requirements of a desired application, the environment it runs on, and/or the desires of a designer/programmer or the like.

"Logic," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Virus," as used herein includes any type of malicious software targeted toward desktops, personal computers, hand held devices and the like. This includes worms, trojans and time bombs. Viruses can take many forms including executable images and script files. "Virus Immune," refers to the ability of a system to operate properly despite components of that system being infected or otherwise compromised by a virus. Operating properly includes both protection of data items and operations on those data items.

Figure 1:
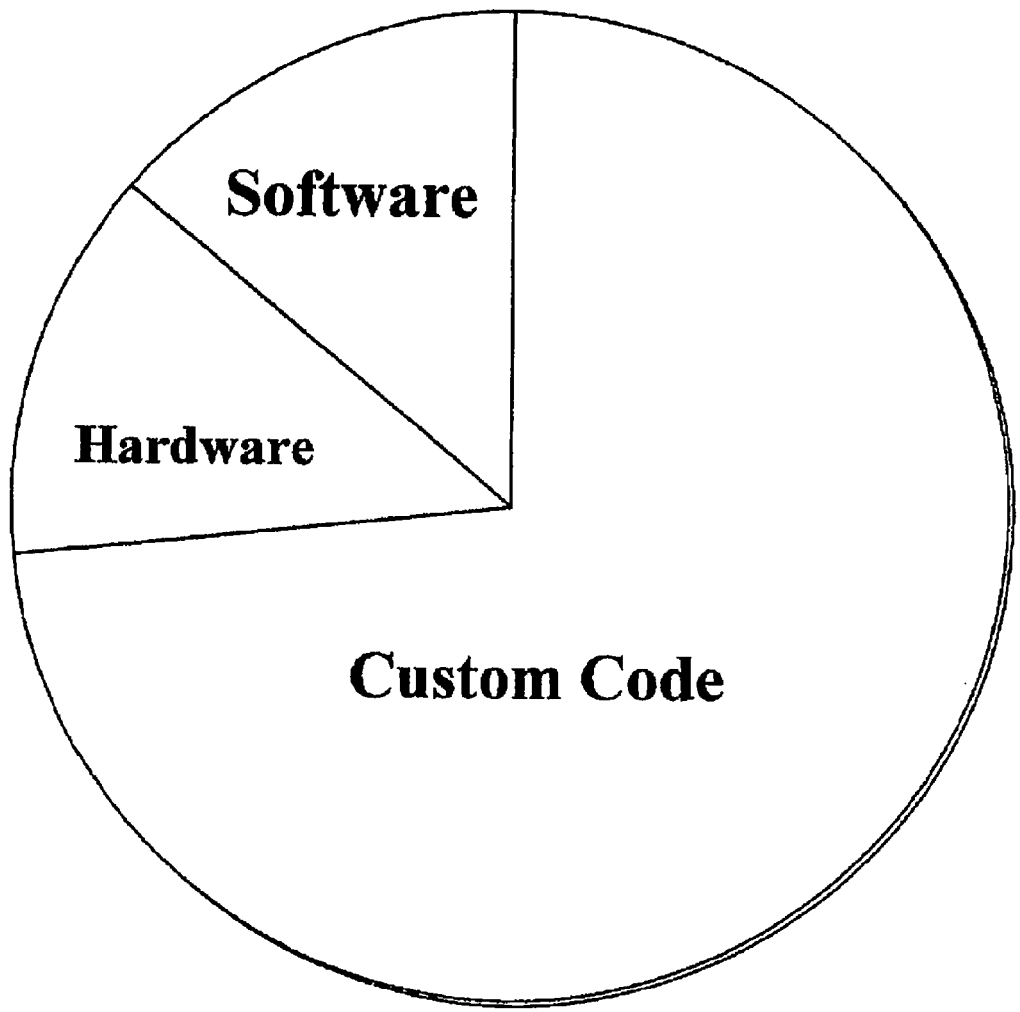
FIG. 1 is a graphical image representative of costs to implement a business or manufacturing automation software project, according to the prior art.
Figures 2A, 2B:
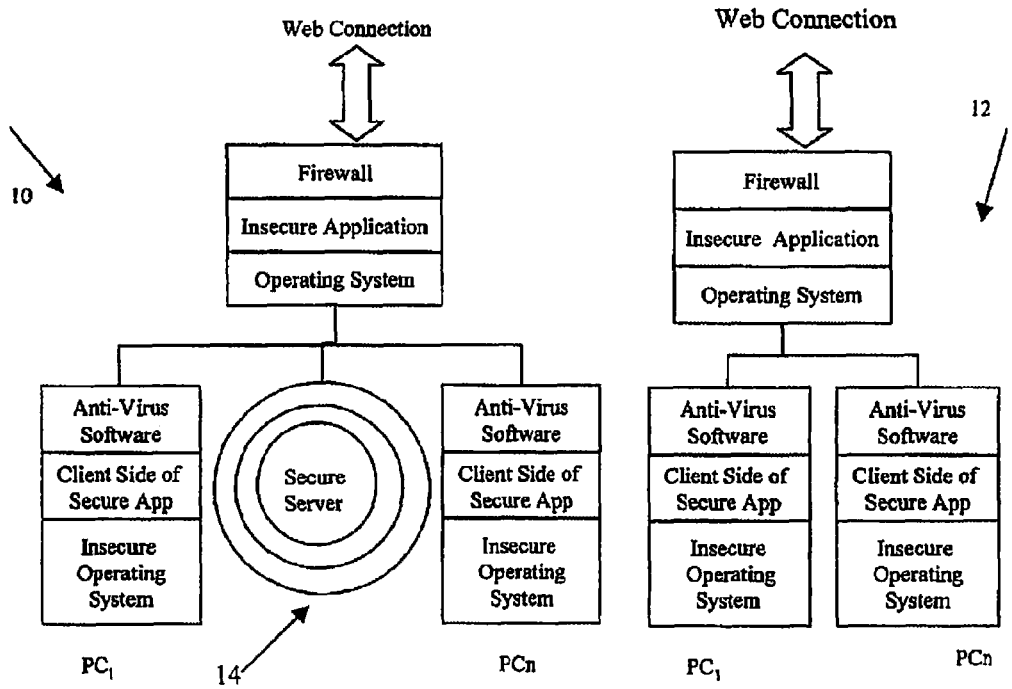
FIGS. 2A, 2B and 2C are architecture diagrams comparing an example of the high-level system architecture described herein with that of an exemplary system architecture contained within the prior art.

With reference now to FIGS. 2A and 2B, a system architecture 10 is shown in comparison to the traditional, non-secure architecture 12. Architecture can include the logical organization of software components, showing the data paths between them. Architecture may also include the distribution of software functionality across hardware components or platforms. The secure server executes a properly-configured secure O/S. The secure O/S may implement a reference monitor 14 (or similar) structure in order to be secure. The reference monitor 14 enforces a predetermined and adjustable system security policy by controlling the access of every subject to every object within the system. The reference monitor 14 maintains an access control list (ACL) which determines which subjects have access to which objects and the manner of allowed access. Subjects can be active entities, user processes, etc. while objects can be files, directories, passive data repositories, etc. The reference monitor 14 also maintains an audit trail so that security-related events can be tracked and reported.

As shown in FIG. 2A, in one embodiment, a system may allocate a portion for execution on the secure server while another portion executes on the client $PC_1$. The client machine can be any common desktop PC with any common operating system, including Windows (all versions), Linux, OS/X (MacIntosh), and the like. Indeed, as discussed more fully below, a system is readily adaptable to operating systems yet to be introduced. The operating systems running on the client machines do not have to be secure or all using the same operating systems.

Figure 2C:
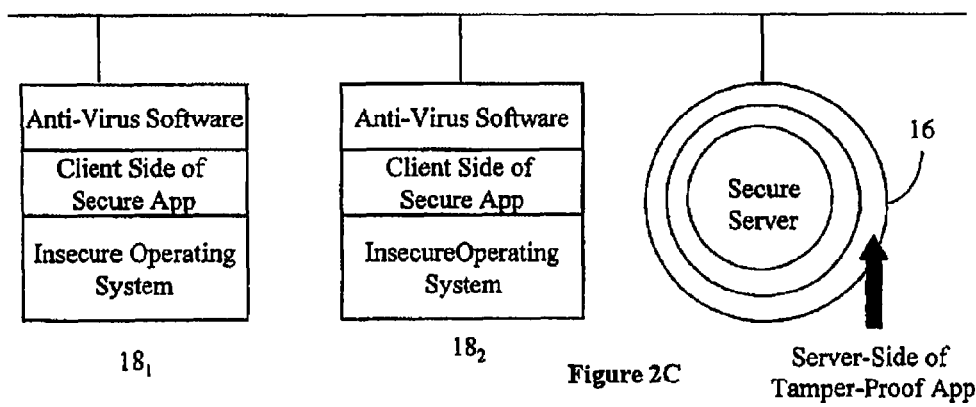

Turning now to FIG. 2C, the assignment of functionality between the TCB 16 (secure server plus secure O/S) and the various client machines 18 is shown. The portion of the system that runs on the TCB 16 performs critical application functions where tampering must not occur. The database and program operations on the database are fully protected. The client portion of the system may perform less critical application functions where tampering may occur but is not damaging to the program data nor proper program operation. Examples of these less critical application functions are data display and other user interface functions. Data display errors due to viruses or other malicious software cannot adversely affect the TCB 16 because the combination of the reference monitor's security attributes and the TCB's O/S architecture being incompatible with desktop executable images and/or script files. Since all viruses use desktop executable images and/or script files, they cannot execute on the TCB.

Figure 3:
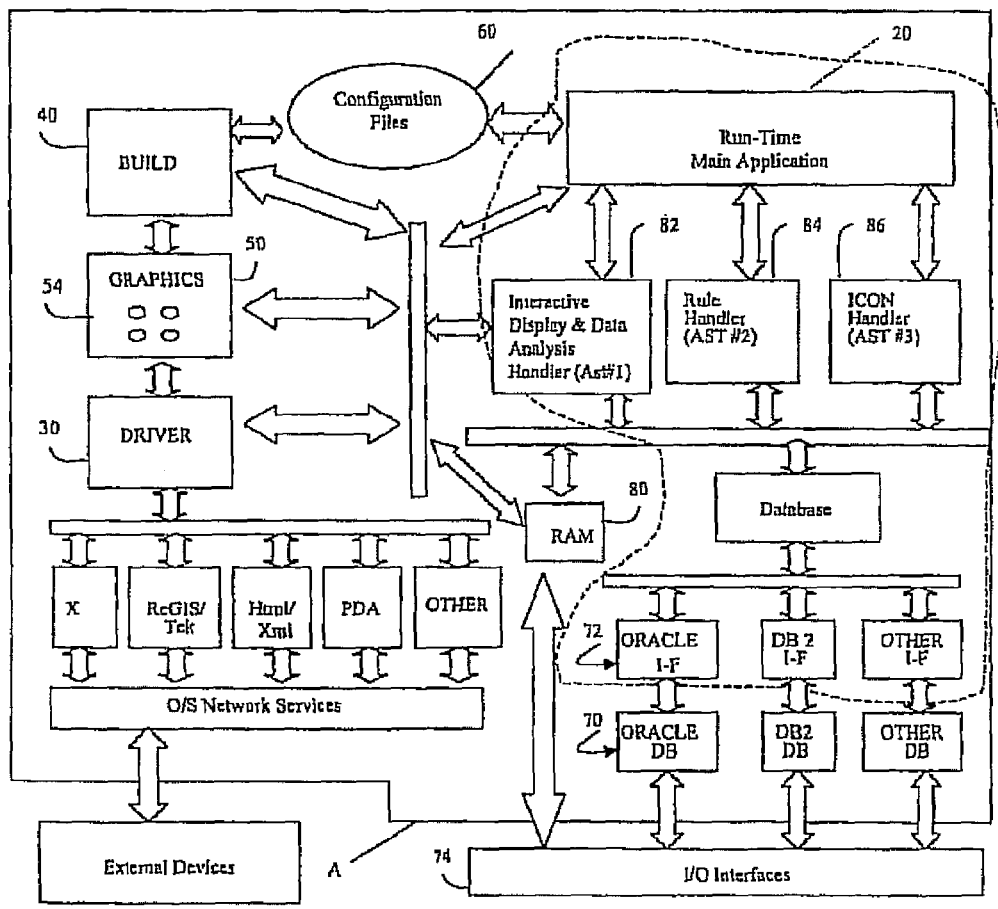
FIG. 3 is an example functional block diagram of software architecture (need to revise this diagram)
Figure 4:
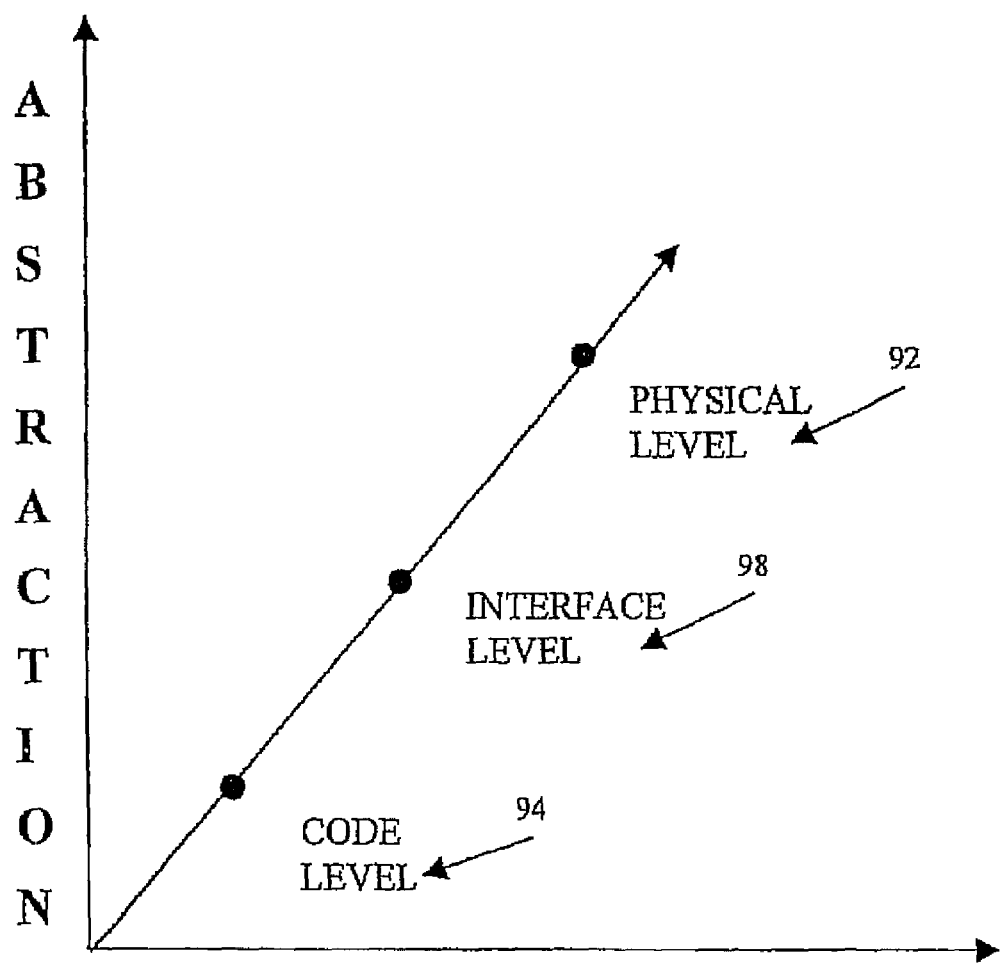
FIG. 4 is a graph representative of increasing levels of abstraction of the computing environment.

With reference now to FIG. 3, a system includes at least one computer platform with network management hardware A and an operating system. Such computer platforms and their operating systems are commercially available from manufacturers such as SUN, HP, Compaq, IBM and others. In one exemplary embodiment, network management hardware or server A runs a resident executable application which provides functionality to client machines in data communication with the server A. The resident executable application may include a number of VIEW 20 images corresponding to the number of users or client machines using the network. Preferably, a single DRIVER image 30 contains the interface components required to support communication with client machines and display devices. DRIVER 30 may contain interface components, whether or not they are used by a specific application. DRIVER 30 may be a sharable image that is installed once, independent of the number of simultaneous users, thus saving memory. VIEW 20 and BUILD 40 may use DRIVER 30 directly to interface with a client machine or display device, although it is more common to use GRAPHICS 50.

GRAPHICS image 50 contains the "Smart Objects" 54. These Smart Objects 54 comprise graphic images, display objects, interactive analysis objects, action icons, etc. In addition to their data presentation aspects, some Smart Objects may also contain data analysis rules and procedures. For example, one Smart Object could be an "X-bar-R Chart." The methods and formulas for computing the various statistical measures that comprise the X-bar-R Chart are well-known in the art. These well-known formulas, rules and/or procedures would be a part of the Smart Object called "X-bar-R Chart." Other Smart Objects could be charts, graphs, spreadsheets, tables, animated objects and the like. GRAPHICS 50 contains these various items, whether or not they are used in a specific application. GRAPHICS 50 may also be a sharable image that is installed-once, independent of the number of simultaneous users. VIEW 20 and BUILD 40 use GRAPHICS 50 to display, update and interact with objects, images, and the like. GRAPHICS 50 may include a wide variety of Smart Objects including new Smart Objects, with new and powerful data presentation capabilities, data analysis rules and procedures. Various image modules, such as VIEW 20, DRIVER 30, BUILD 40, GRAPHICS 50, may be resident on server 10 or alternately distributed across the network or multiple servers.

Configuration files 60 may comprise display/screen files, some menus, dialog boxes, help files, special images, some data analysis instructions, some operational rules and the like and are usually created by the BUILD 40 configurator/editor. Alternatively, some of the configuration files may be edited with a normal text editor. This allows non-graphic, text-based devices such as cellular and mobile phones to configure/modify the system—an advantage for supporting systems remotely where, for example, high-speed connections may not be available. Alternatively, some, or all configuration information may be contained in one or more relational databases 70.

Ram-resident database(s) 80 are non-executable images that are sharable, global storage areas for various kinds of real-time data and status information. Preferably, databases 80 are external to the executable application 20 although they may physically reside on the server or be disposed elsewhere on the network.

Relational databases 70 are optional. These can be any relational database such as Oracle, DB-2, Informix, Sybase, etc. Oracle is preferred but not required. These databases may contain historical data, object action rules, some data analysis rules and may include any or all other configuration information. Data communication with any or all of the relational databases occurs through specialized interfaces 72. Input/Output (I/O) handlers/interfaces 74 are also optional and support communication with intelligent instruments, PLCs, DCSs, controllers, foreign databases and the like. These I/O handlers implement the specific communication protocol(s) used by the various external devices and can communicate via a network or a dedicated serial port. These I/O handlers generally take data in ram-resident databases 80 or in relational databases 70 and send it to the particular external device. Conversely, these I/O handlers generally receive data from the external device and place it into either ram-resident databases 80 or in relational databases 70 or both. All communication with external devices, except for user display devices and client machines, is handled by one or more input/output handlers 74 (also called input/output drivers).

In a simple configuration, a system may be composed of four executable images: VIEW 20, DRIVER 30, BUILD 40 and GRAPHICS 50. GRAPHICS 50 and DRIVER 30 can be sharable, re-entrant executable images that are used by all copies of VIEW 20 and BUILD 40. Beneficially, one copy of DRIVER 30 and GRAPHICS 50 may be installed on a given system, even if there are many simultaneous users.

The BUILD 40 image may be used to set up configuration files 60 and optionally relational databases 70 and ram-resident databases 80 so that VIEW 20 can read them and function as the customer-specific application. Although the function changes, VIEW may not change in any way. Rather, VIEW may behave differently, which is really what a new software application is all about—different behavior and/or functionality. This differs from traditional object-oriented programming techniques. In object-oriented programming, significant new functionality in a program is implemented by creating new object(s) and/or re-linking existing ones to form a new executable image. This re-linking can often mean an interruption in program operation which may not be permissible in mission-critical situations. The architecture of this system may avoid this problem because a new executable image may not be created. Significant new functionality can be added simply by changing the configuration information which may be distributed across configuration files 60, relational databases 70 and ram-resident databases 80 and/or the rules that may be separate or embodied therein.

As listed above, a system may include the GRAPHICS, DRIVER, VIEW and BUILD, various configuration files and a database. For each specific application, the same VIEW, GRAPHICS and DRIVER images may be used. In one embodiment, only the configuration files 60, the database 70 (often, but not always) and/or RAM 80 may be altered. This is in sharp contrast to other application creation methods where components, modules, routines, etc. are added/edited/deleted and relinked to create a new executable image.

GRAPHICS 50 may already contain the "Smart Objects" 54 needed. These Smart Objects 54 may comprise graphic images, display objects, interactive analysis objects, action icons, etc. In addition to the data presentation aspects, some Smart Objects may also contain data analysis rules and procedures. If a given application does not need all of the Smart Objects, they may simply not be used, even though they are still present in the software. Thus, GRAPHICS 50 may stay the same regardless of the application. Some Smart Objects 54 may be display objects that control how information is displayed or how it appears to a user. Example Smart Objects may include charts, tables, graphics, numbers, geometric shapes, equipment, images, and the like. Some Smart Objects 54 may include data analysis procedures, rules, etc. within them that may be object-specific and unique. Data analysis rules, procedures and object methods that are common to all Smart Objects need not be included in the Smart Objects 54. Rather, common object methods may be contained in the BUILD 40 module and VIEW 20 module as required. This may save considerable memory and may allow these common object methods to be changed dynamically. Smart Objects 54 are typically static, but may be configured by the BUILD 40 module during the configuration process. They may be configured to do a wide variety of things, including (but not limited to) getting data, performing mathematical analyses, graphic animation, changing in response to external conditions, etc. Each Smart Object may have its own specific set of things that it is able to do. Smart Objects may have different visual display characteristics and data handling attributes may be defined and added to Graphics 50 at any time. Such additional Smart Objects are within the scope of the present disclosure.

Similarly, DRIVER 30 may include the components needed to interface with all client machines and/or display devices. If a given application does not need all of the interface components (because, for instance, the client machines are all of the same type) then the other interface components may simply not used, even though they are still present in the software.

The VIEW utility 20 may be the one executable image that runs on the server computer (HP, Sun, Compaq, Linux, etc.). It may be the only executable image needed for a system. This executable image may be relabeled as required to look like an industry- or market-specific software product, but the actual executable image is still VIEW 20 and is not changed. As previously explained, changing the configuration information can make the VIEW 20 image behave like a completely different product.

To advantageously make one image look and act like a completely different product, the configuration information, contained in either files 60, relational databases 70 or RAM 80 or any combination, or the rules separate from or contained therein may be changed. The configuration information 60, 70, 80 may configure VIEW 20 regarding operation, including what to visual attributes to display, what database tables, fields, datatypes to save to (Data Destination) or retrieve from (Data Source), what data to analyze, how to analyze it, what menus to show, what menu options to execute, what dialog boxes to have, what help files to have, what action(s) to take as a consequence of events such as user input or data value change, what rules to implement, what external/internal procedures to run, etc. So, different configuration information 60, 70, 80 can configure VIEW 20 to act like a different software product, including defining a set of actions and events on which the actions are predicated.

Architecturally, in one embodiment VIEW 20 may consist of two parts I, II. Part I may read the configuration information 60, 70, 80 for the menus, dialog boxes, etc. and sets up the user interface accordingly. Part I may also read the display configuration files as requested by external events, internal or rule events and/or user input (that can also be thought of as an external event). Based upon the display files read by Part I, Part II may gather data, dynamically route it to the proper Smart Object(s) 54, perform some limited analyses (most analyses may be done by each Smart Object), look for desired events and take the corresponding action(s) as required.

Part II may act as a spawned process that executes at a dynamically adjustable rate. Part II may include three components: interactive display and data analysis handler 82; rule handler 84; and icon handler 86. Note that Part II may be a spawned process or may be an internal routine that can be scheduled to execute as needed. This design choice is a function of the capabilities of the particular server's operating system.

The interactive display and data analysis handler 82 may get application data from services specified by the configuration information 60, 70, 80. As further dictated by the configuration information, analysis or computations may be performed and data, results, and the like may be stored in places also specified by the configuration information.

Rule handler 84 may read rules from sources specified in configuration information 60, 70, 80 and execute these rules. These rules may be generic and may specify events, actions, data sources, data operations, data destinations, visual attributes, and data analysis for both application data and computational results. In some applications of the invention, data may be obtained from an external source corresponding to a real-world event. In other applications, writing data to a destination may cause an action to be taken. For example, a "Pressure Safety Rule" could be constructed such that if the pressure in a pipe exceeds a certain threshold, then a safety valve should be opened to release fluid and reduce the pressure. In this example, the communication handler and/or the I/O driver ensures that external pressure data is placed in either the ram database 80 or the relational database(s) 70 or both. The communication handler and/or the I/O driver also ensures that the "Pressure Safety Rule" data output (i.e., opening the safety valve) is sent to the external control device. The specific data formats, data locations, data sampling rates, etc. may be set up as part of the system configuration process using BUILD 40.

Icon handler 86 is a routine that reads a subset of simpler rules contained in the icon Smart Objects 54 in the displays. These icons and the rules they contain may be set up during the configuration process using BUILD 40. Icon handler 86 may read these rules in the icon and execute them. This may result in the icons obtaining information from the configuration information 60, 70, 80 and producing results that may be stored to other locations identifiable through the configuration information or otherwise. Icons can also receive user input directly via mouse clicks, keyboard commands, and dialog boxes. Further, icon information can also be password protected or conform to other authorization schemes. For example, audit logic may be configured to audit received external events and rule events. The audit can include recording event initiation data and selectively approving event action. Exemplary events monitored in this fashion can include thresholds, rates of change, user inputs, time, comparison results, and the like. Representative actions in response to these events include getting particular screens, altering a display, running an internal job, issuing commands to external applications, setting or changing menu options, writing an output or result to a location, performing calculations, and the like.

The BUILD configurator 40 (editor) can be used to set up the configuration data 60, 70, 80 for the VIEW utility 20. In a one embodiment, BUILD may look and feel like a graphics editor. This may make it easy and intuitive to learn. BUILD may produce the configuration data required for the particular application. This configuration information may specify which Smart Objects 54 to use, what each object's data source(s) and destination(s) are, what processing is to be done on the data and how the object's appearance is to be altered as a function of the data and subsequent processing and functionality as discussed above.

For data sources or destinations that are within a relational database 70, the tables, views, fields, data types, data processing, TCP/IP address, account and password, etc. may be set up via BUILD. SQL queries, common "where clauses", database triggers, and such all may be set up as part of the configuration process via BUILD 40.

For RAM-resident database 80, the data sources, the pointer(s) to the data locations, the data identifiers are also typically set by BUILD 40. Also, data processing rules can be established by BUILD to provide the behavior demanded by the application. These data processing rules are normally saved in the configuration files 60 but can also be placed in the relational database 70.

"Action Icons" are one kind of Smart Object in GRAPHICS 50. These objects may associate an event with an action. Using BUILD 40, an "event" may be defined to observe, for example, a threshold value for a real-time input, a database field value, an alarm condition, or a user input (i.e., a mouse click). Then, an action is defined for whenever this event occurs. For example, the action can be to display a new report/screen, force a real-time output to a new value, write to a table/field in the database, execute another rule, or any of a variety of actions. Configuring an action icon to perform an action may be done through BUILD 40. As is the case with other configuration information, the action icon settings are normally saved in the configuration files 60 but can also be placed in the relational database 70.

In one simplified embodiment, when VIEW 20 executes (i.e., the application is running) it may loop awaiting an event. When one or more of the events occur, VIEW 20 takes the requested action(s). One possible action is to spawn an external (i.e., a foreign) job feeding data or pointers to external applications. For example, if VIEW is configured to act as an environmental monitoring software system, it may have to recalibrate environmental sensors from time to time. Since sensor re-calibration applications are normally supplied by the sensor manufacturer, an action icon might be configured to launch this app whenever a sensor re-calibration is needed. The action icon would not have to know anything specific about the operation of the sensor re-calibration app. It is now apparent that the action icon would only have to know the app identifier, initial parameters to be sent to it and the command string to launch it. This may allow the integration of pre-existing foreign and perhaps incompatible software without having to understand it or link to it at the code level. A command string may be sent to the operating system of the machine where the app to be launched resides. The operating system can interpret the command string and launch the application. This may allow use of pre-existing, specialized applications whenever required. Other variations exist for this idea for using pre-existing, external software without connecting to it at the code level. All such variations are within the scope and spirit of the disclosure.

As an example, if an anomalous condition is detected, VIEW 20 can automatically launch and communicate with a pre-existing application specifically designed to handle the anomalous condition. This powerful feature advantageously employs other software and pre-developed, pre-tested applications. This powerful feature also eliminates unnecessary code development that would traditionally be required to take advantage of external, specialized apps.

Referring to FIG. 3, a chart illustrates levels of abstraction within the computing environment. Illustrated are exemplary levels at which "compatibility" is required. At the top, physical user 92 interface compatibility is among the highest abstraction including, for example, the display screen, mouse, keyboard, speakers and the like. In other words the computing environment is compatible with the human sensory system. Toward the other side, individual applications are designed to have software, or code level 94 compatibility. This level of abstraction deals with proper paths, subroutine calls, APIs and the like. It can now be appreciated that towards the lower levels of abstraction, change often occurs relatively quickly. However, resistance to change increases as the level of abstraction increases. Additionally, at lower levels, decisions which relate to compatibility are often made by few people, perhaps a single company. On the other hand, as the level of abstraction increases, compatibility decisions become more decentralized.

A previous attempt at compatibility at the code level 94 that provides an object lesson into why compatibility at this level tends to be inconsistent with market place realities is the introduction and evolution of JAVA. The JAVA language was created by Sun Micro-systems and was intended to allow software development in one common language, without regard to the underlying operating system or computer platform. Microsoft obtained a license for the JAVA technology and began inserting proprietary extensions to the JAVA language. These proprietary language extensions later appeared in a Microsoft programming manual called "J++." These proprietary extensions were not seen by Sun as being compatible with the JAVA language standard. The tension was that Microsoft wanted to push their proprietary language extensions so that programs written in J++ would only work on Microsoft platforms, thus defeating the entire interoperability purpose of JAVA in the first place. This tension eventually resulted in litigation with the practical upshot being that Microsoft has launched a new operating system, Windows XP, which is not JAVA-compatible. This entire language evolutionary process took less than six years. Thus, at the code level, change is quite rapid and "new" and "universal" standards may not be standards at all for very long.

Above code level is the "interface level" 98. This level tends to be multi-vendor controlled and standardized, and thus supported for relatively long periods of time. Examples of software interfaces at this level are TCP/IP, SQL, X-Windows, etc. One aspect of the invention is a software system that provides interoperability and cross-platform functionality at or above the interface level 98. Interfaces have a much longer lifetime—often ten times the lifetime—than operating system APIs and other code-level conventions. Consequently, standardizing at the interface level results in a software system with a much longer lifetime than standardizing at the code level. It is an aspect of this invention to standardize at or above the interface level.

Figure 5:
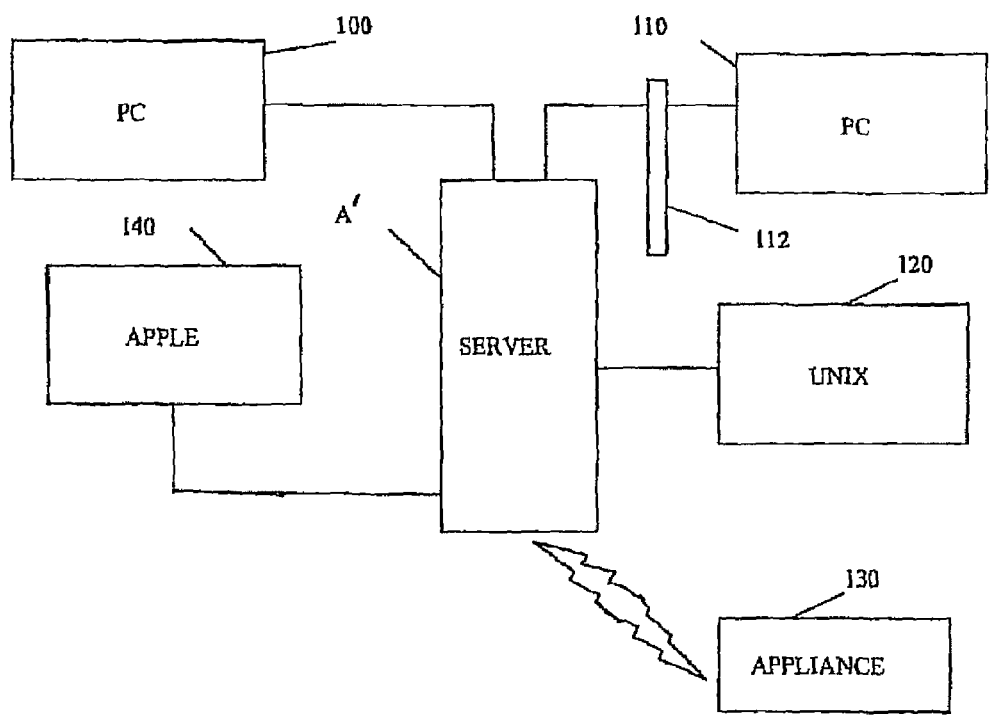
FIG. 5 is an exemplary network diagram.

With reference now to FIG. 5, a network is illustrated which includes a various client machines with various operating systems and network connections operably connected to the server A'. Client machine 100 is a Wintel device directly connected to the server A', while client machine 110 is another Wintel device, perhaps with a similar but more recent operating system, connected to the server A' through a data bus 112. Client machine 120 is a representative device using a different operating system such as UNIX connected via a parallel data cable, while personal appliance 130, such as a PDA, telephone or other device is connected via serial wireless connection. Any data connection mechanism such as RF, infrared, or hardwire connection may be substituted with no loss of functionality. Client machine 140 may be an Apple device on the network to further illustrate platform independence.

Platform independence is achieved by the client-server architecture. New desktop platforms are treated as clients. They are not used as servers, but may optionally be used as such, depending upon their capabilities. New clients may be added at any time if they are already supported by Driver 30. New client types can be accommodated simply by creating a translation module for the new client type and adding it to Driver 30. The translation modules convert the client-independent interface information used by the single application into a form understood by the new client type. For some client types, an X-Windows emulation performed by Driver 30 would suffice. Web-based clients such as browsers, for example, would use the XML/HTML capabilities of Driver 30. Any number of new client types may be added in this fashion. This architecture allows the inexpensive and non-secure client machines to be used for what they are best suited for: high-performance, interactive data presentation devices that handle user interface tasks and perform some local analysis functions.

Since the desktop, and indeed most client machines, change rapidly, using the desktop as an interactive data display/data entry device with some local analysis capability makes the most design sense. By comparison, changing the server architecture every few months to keep up with desktop changes is very costly, time consuming, error-prone and may not add any value, functionality, reliability, speed, and the like.

Data analysis is rule-based. Data analysis capabilities are built into each display symbol or Smart Object 54 in the symbol library or GRAPHICS 50. Each symbol can be set to appear as desired, perform arithmetic and mathematical computations, send results to a database, etc. Additionally, "non-visible" symbols can be used to do the same operations. For special cases, code can be written to handle analyses that do not fall into a standard category. Generally speaking, a new Smart Object 54 is created and/or additional functionality is added to existing Smart Object(s) 54 to handle such situations.

Data acquisition is done by the server A. It can also be done by external equipment such as sensors sending real-time messages to the server, in any format. Client machines which are used for human-system interaction can be used for data acquisition but are not recommended for this duty. Isolation of the data acquisition, analysis and storage features provide virus-immunity because client machines or other virus-prone devices are isolated from the server and databases. This also preserves the interrupt-driven real-time performance of the data acquisition process. Additionally, many viruses employ scripts or binary code configured to exploit WINTEL based systems. Desirably, these scripts and codes are ignored by systems not employing the WINTEL architecture.

For applications that are not time-critical, acquired data can be transferred to a relational database 70 (FIG. 2). Data can also be acquired directly from one or more existing relational databases via SQL/ODBC. Data is acquired from control equipment and instrumentation via the specific manufacturer's communication protocol and hardware interface. This varies from device to device. In any case, the acquired data is either written to a RAM-resident database 80 (for applications requiring sub-second response) or directly to a relational database 70 such as Oracle.

In one embodiment, the application typically uses non-Microsoft platform(s) for the server. These platforms usually have a real-time OS (Compaq's Tru64 UNIX, OpenVMS, HP-UX and Sun Solaris). They are also relatively immune to desktop viruses because they do not run common desktop operating systems and typically do not have the virus-prone MS-software (Outlook, Excel, Explorer, etc.). Such servers are also more secure in their fundamental design and have protection against malicious software that is simply unavailable in common consumer-type desktop platforms. The server architecture and O/S also allows rigorous and effective protection schemes to be incorporated into the application so that the software will continue to operate properly even in the presence of viruses and other malicious software.

With continued reference to FIG. 5, an MS client machine, such as 100, in a system may be affected by viruses. In this case, the infected client machine 100 will not be able to perform the display/user interaction functions because of the virus. On the other hand, database, data acquisition, data analysis functions and the like are done on the protected server 10' and not relegated to the client machines 100, 110, 120, 130, 140. Thus, these critical functions are protected and immune from infection by viruses originating on or designed against MS products or any client.

This also keeps desktop-based viruses from hindering system operation. When a desktop is infected, it may cease to function properly (if at all) but it will not in any way affect the operation of the server or system herein disclosed. As an additional security measure, preferably, non-Microsoft operating systems are employed on the server. Such operating systems may include real-time, 64-bit, hyper-reliability, reducing the likelihood of problems such as viruses.

Figure 6:
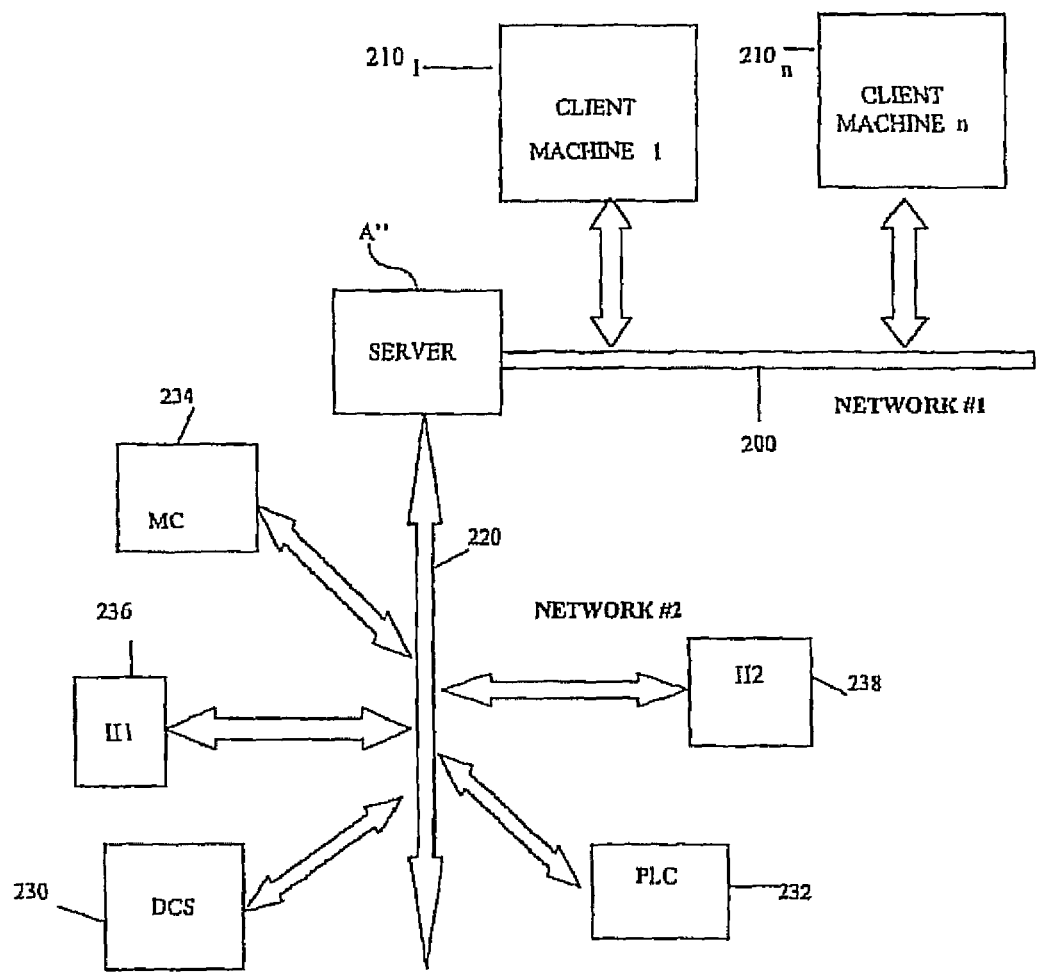
FIG. 6 is another exemplary network diagram.

With reference now to FIG. 6, an example first network 200 including a plurality of client machines $210_1$-$210_n$ is connected to a server A" residing on a second network 220 having various components such as interfaces 230, 232, 234, 236, 238. As illustrated, the second network 220 supports server A" by providing access to remote input/output interfaces such as distributed control system 230, programmable logic controller 232, microcontrollers 234 and other intelligent instruments 236, 238.

Figure 7:
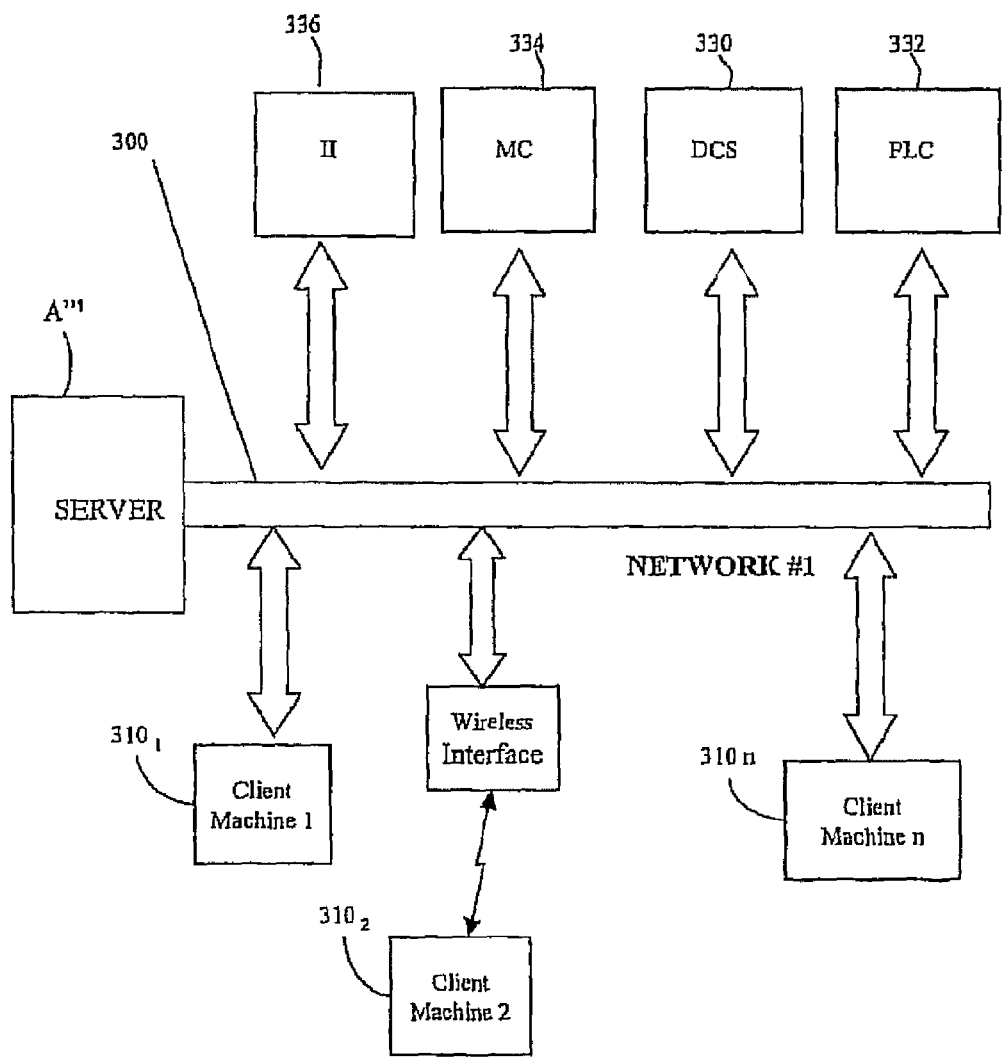
FIG. 7 is yet another exemplary network diagram

With reference now to FIG. 7, an example single network 300 includes both plurality of client machines $310_1$-$310_n$ and interfaces 330, 332, 334, 336, connected to server A'''.

Figure 8:
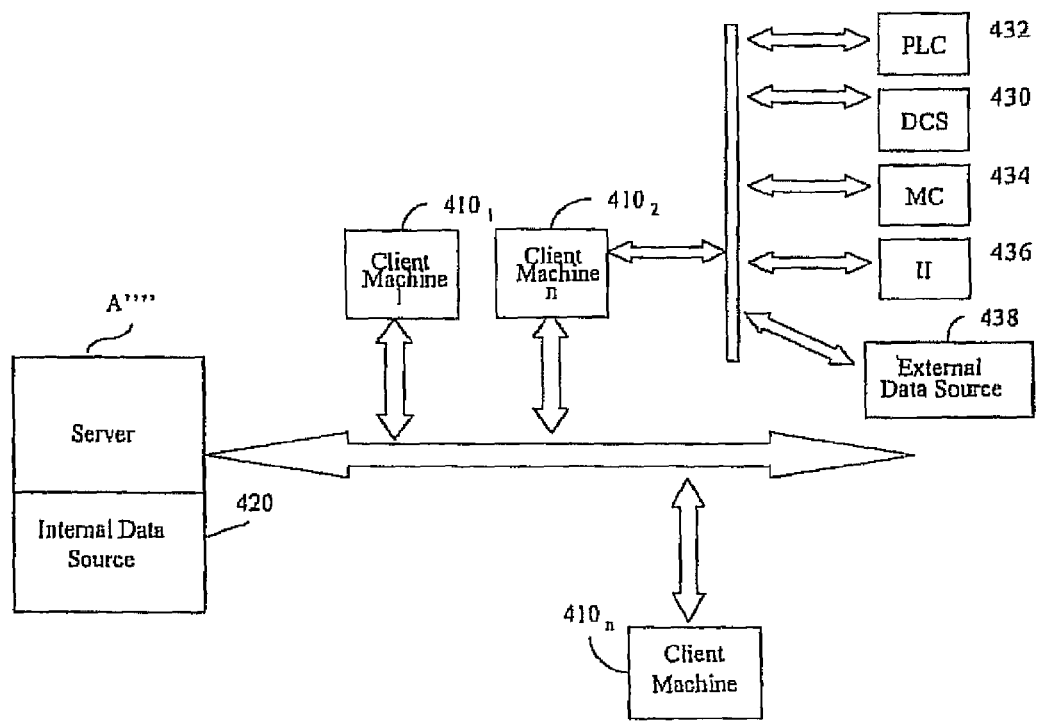
FIG. 8 is still another network diagram.

With reference now to FIG. 8, an example network 400 includes a plurality of client machines $410_1$-$410_n$ and an internal data base 420 within server A"". Interfaces 430, 432, 434, 436 and an external data base 438 are in data communication with the network through a selected client machine $410_2$.

An alternate embodiment of the invention is to define a rule to be of the form "upon one (or more) event(s), take one (or more) action(s)". Mathematically, rules are of the form:

$$\text{if } f\{e_i\} \text{ then do } g\{a_j\}$$

where $\{e_i\}$ is the set of allowed events and $\{a_j\}$ is the set of allowed actions. The events and action definitions are sufficiently general to handle a wide variety of software and process requirements including master data management (MDM), business intelligence (BI), business logic, work flow and similar functions. This rule definition allows nearly any arbitrary flowchart (or business process) to be converted into a fully-functional, secure, and inter-operable software system by this invention. The event-action pairs are orthogonal so that any event(s) can cause any action(s) to be taken without limitations.

Figure 9:
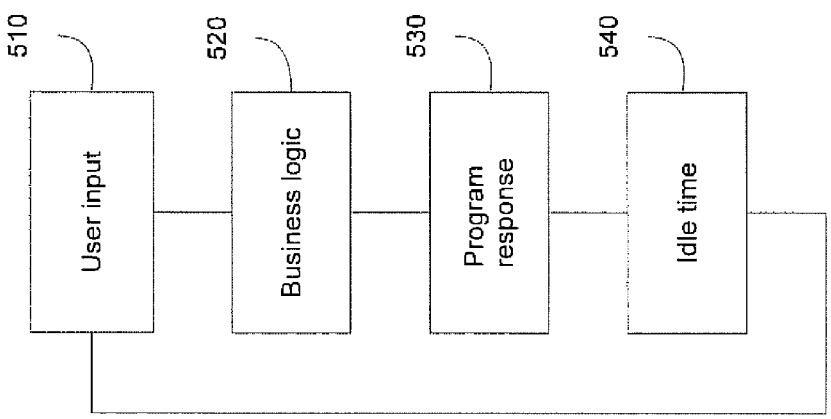
FIG. 9 shows the structure of a typical software application, which includes sections for user and/or external input, "business or operational logic", program response and "idle time"

FIG. 9 shows a typical software process flowchart. Typically, a software application receives a user input, block 510, such as a key press, mouse movement, mouse click and the like. Business logic processes the input and makes one or more decisions, such as examining the user input, examining program state, examining other conditions, and/or making other decisions, step 520. The logic then performs one or more operations, executes routines or terminates in response to the decision, step 530. After performing the operation(s) (or spawning them for multi-thread applications) the application then waits for the next user input and event, step 540. In traditional software design and deployment, nearly all of this processing occurs (or can occur) on the desktop or laptop machine. The problem here is that encrypted data is still decrypted on the PC and stored as 'plaintext' in RAM—where it's vulnerable to "spyware". Further, "spyware" and "malware" can both observe and interfere with this process because it all occurs on the desktop or laptop. Malware can also observe, interfere and/or 'steal' critical data which is the primary vulnerability of all traditional software applications.

Figure 10:
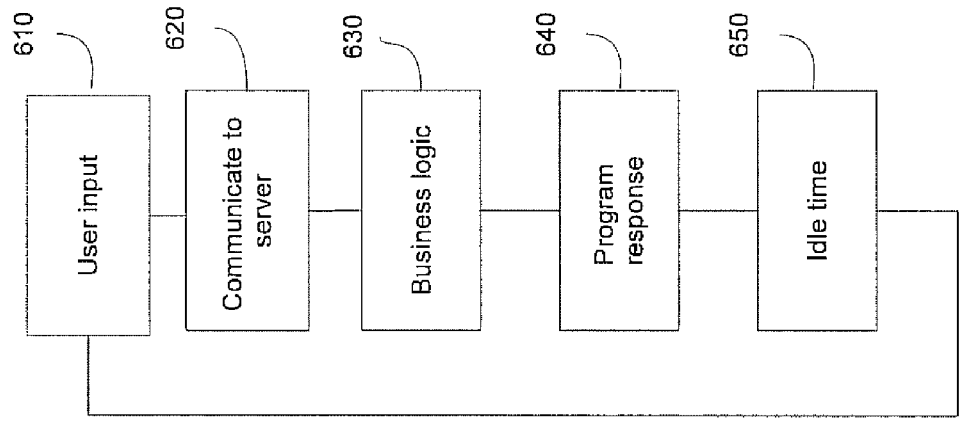
FIG. 10 shows the separation of the "client part" from the "server part" of the application.

FIG. 10 shows the separation of the "user input piece" from the rest of the application so "malware" cannot "infect" the critical business logic and program operation. This is also done in other embodiments of the invention. In one embodiment, a software application receives a user input, block 610, such as a key press, mouse movement, mouse click and the like. The user input is communicated to, for example, a TCB (Trusted Computing Base) that is DoD rated B2/C2 (or better) is used for the secure server. At the server, business logic processes the input and makes one or more decisions, such as examining the user input, examining program state, examining other conditions, and/or making other decisions, step 620. The logic then performs one or more operations, executes routines or terminates in response to the decision, step 630. After performing the operation(s) (or spawning them for multi-thread applications) the application then waits for the next user input and event, step 640. The separation allows the use of any kind of laptop, desktop or hand-held (so called "palmtop") device for the "user input piece". This separation allows the use of any kind of operating system for the user input piece", e.g., Windows, Linux, Apple, Palm-OS, etc.

The secure server handles all program logic, decision making and operation execution and all communication to/from client is encrypted. Note that any encryption method may be used allowing for the incorporation of new and better encryption/decryption technologies as they are invented.

FIG. 11 shows one embodiment of how the client part, 710, and the server part, 720, communicate, for example, using the "network cloud," 730. All user input events (UIF events) are encrypted and sent to the server, 720. No sensitive data (e.g., UID or PWD strings) is in the client's RAM as a single string. With this architecture, malware within the client device, 710, cannot "infect" the secure server, 720. The client, 710, may be very "thin" and use XLIB which is available as open source freeware for Windows machines. XLIB is typically included automatically with the Linux, Apple, Google's "Chrome" O/S and SUN O/S operating systems. Any PC may be used as the client device, 710, including Windows, Linux, Apple, UNIX-based machines, PDAs, palmtops and even some cell phones.

The secure server, 720, controls all business logic and makes all application decisions. The secure server performs all application operations. Malware cannot affect the secure server which has a DoD rated B2/C2 (or better) operating system. Optionally, so-called "CAPTCHA" technology (Completely Automated Turing Test to tell Computers and Humans Apart) can be used so that text strings (e.g., SSNs, UIDs, PWDs, etc.) are never sent to the virus-prone PC client, 710.

FIG. 12 shows the Rule database, 810, and how it governs the operation of the server part, 820, including the "Business Logic" and the "Program Response" sections. The rules control the business logic, program state, other conditions. Rules also control screen appearance, menus, toolbars, user interface (UIF) devices (e.g., widgets, gadgets, windows, etc.) and other visual aspects of the application. Rules control all program decisions and operations. The rules control all database access, data formatting, data presentation and data display. Additionally, the rules may be configured graphically without any programming. Rules can be changed "on-the-fly" so new functionality can be added while the application is running so there is never a need to shutdown or reboot.

Figure 13:
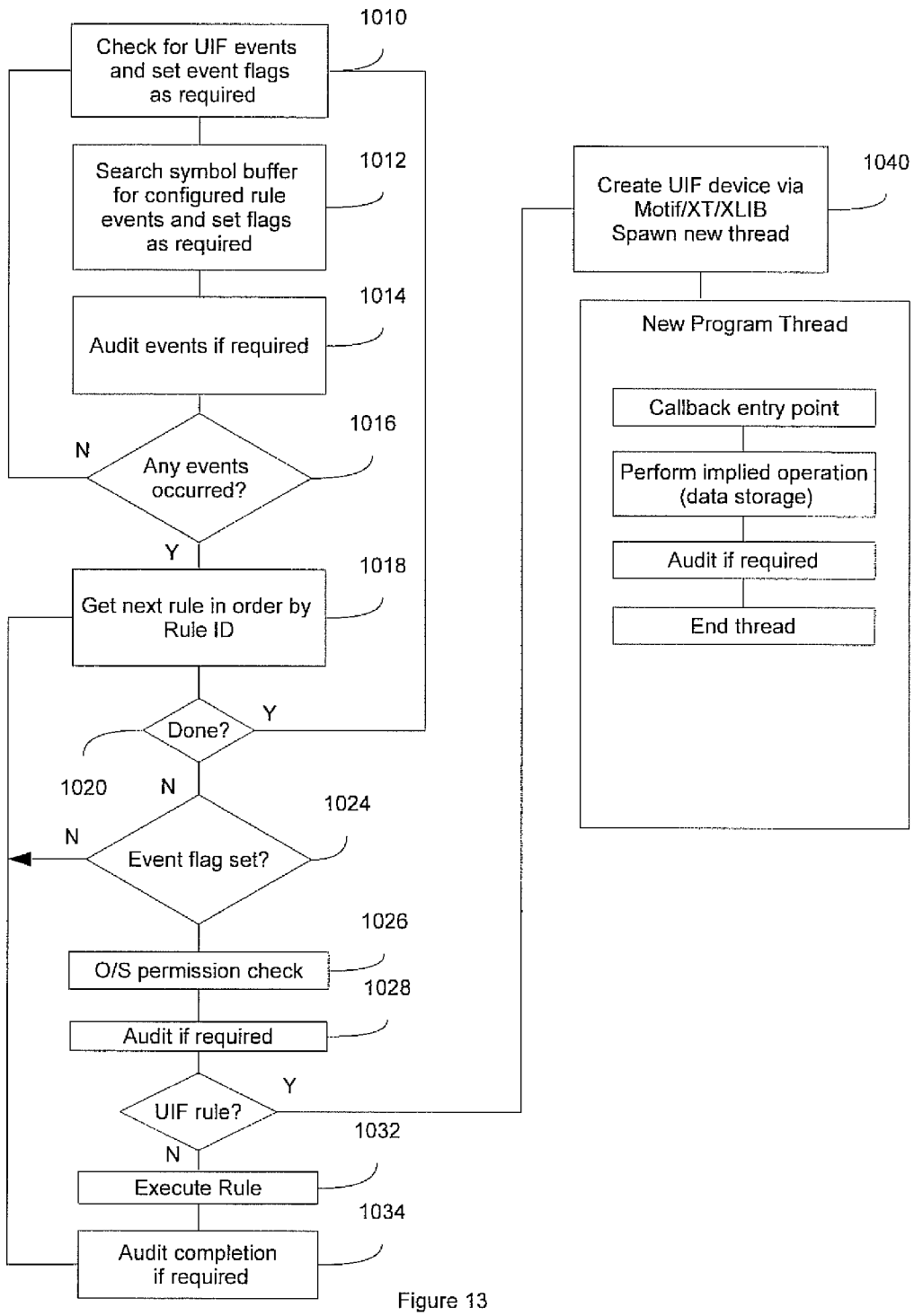

FIG. 13 shows one possible structure for the Rule Processor (RP), including the event loop, the action loop, audit processing and security sections. The flowchart for the rule processor is planar which means that there are no crossing lines. This feature is unique and is critical to the mathematical verification of the correctness of the Rule Processor software code. From basic graph theory, planar code can be analyzed much more easily because of its simplicity. Non-planar code, in sharp contrast, may have an exponential number of separate execution paths which makes its analysis an NP-hard problem.

The exemplary structure first checks for UIF events and sets flags as required, 1010. The symbol buffer is searched for configured rule events and sets flags as required, 1012. If required the event is audited, 1014. If no events occurred, the RP loops back to check for UIF events, 1016. If an event occurred, the next rule is obtained in order, 1018. If finished, the RP loops back to check for UIF events, 1020.

If not finished, the RP checks for setting of an event flag, 1024. If the flag is not set the RP loops back to getting the next rule. If the event flag is set, the RP checks if the operating system permissions are appropriate, 1026. Next, the system conducts an audit if required, 1028. If the event is not a UIF rule, the rule is executed, 1032 and the audit is completed if required, 1034. The system then loops back to get the next rule, 1018. If the event is a UIF rule, a UIF device is created and a new thread spawned, 1040.

Rules may be categorized according to function. A sample list of rule categories is given below. Note that some functions may be combined and/or they already overlap. That is intentional because a certain amount of redundancy in what objects can do provides alternate paths for accomplishing the final operational goals of the system. Exemplary functional categories of items that are governed by rules are the following: (a) Object/Screen display or other rendering operations; (b) User interface (UIF) object rendering and control; (c) Database operations; (d) Data acquisition; (e) Data analysis; (f) Data transfer (from anywhere to anywhere); (g) Report preparation, formatting and output; (h) External O/S actions (e.g., run a job, execute command procedure, etc.); (i) User input handling; and (j) External input handling.

Each rule can have multiple classes of parameters to specify it. Other rule parameter classification systems and/or a different number of rule parameter classes may be defined without deviating from the spirit of the invention. Nine (9) classes of rule parameters suffice for one embodiment of the present invention. These rule parameter classes are listed: (a) Summary information (e.g., data storage, Rule ID, Rule location, etc.); (b) Events (E); (c) Actions (A); (d) Data Source (DS); (e) Data Destination (DD); (f) SQL Source; (g) SQL Destination; (h) Visual Attributes (VA); (i) O/S Permissions (OSP); (j) Access Modes (AM); (k) Users Allowed; (l) Audit specifications (AU) and (m) Audit rules.

Each one of these parameter classes are logically independent. This means that any event can be combined with any action, with any DS, with any DD and with any VA, etc. to provide functionality to the final system. Further, each new event, action, DS, DD, VA, OSP, AM, AU that may be created improves the performance added to the rule architecture maintains its logical independence so the capability described in this embodiment can grow exponentially.

Classes of Data Source and Data Destination Operands

Multiple classes of data source (DS) and data destination (DD) operands can be created. One of ordinary skill in the art will appreciate that other DS and/or DD classes may be added at any time. In one embodiment, eight (8) DS and DD classes are defined and used. These operand classes are called INTERNAL, MADT, SCRATCH PAD, EXTERNAL, ORACLE, USER, WIDGET and STATUS. Each of these classes may have three operand data types: INTEGER, REAL and STRING/CHARACTER. The meanings of these operand classes are listed in the table below:

| | |
|---|---|
| INTERNAL | the operand is contained within the symbol itself, which is a rule symbol or a symbol with rule capabilities. Note that any symbol with RULE capabilities has non-zero values within the symbol descriptor INFO_LIST(16,*). This is the descriptor which contains the pointers to the values and counts of the various rule parameters. |
| MADT | the operand is contained within the Main Data Table (MADT). The MADT is public to all processes and is generally used only for things that must be shared between users. |
| SCRATCH PAD | the operand is in the scratch pad, which is like the MADT in structure but is process-private. The scratch pad is declared and managed by the rule processor, IQ_RP. The scratch pad is used for items specific to each user's instantiation of the architecture. The "scratch pad" is the process-private (i.e., it is unique to each user) means of intra-screen rule communication and inter-screen communication. Any required "global parameters" are either in MADT (for real-time variables) or in the database (for non-real time variables). Both inter-screen and intra-screen (i.e., rule-to-rule) communication may be accomplished by "parameter passing" in the scratch pad. The scratch pad operates like a mailbox where data may be written to and read from. The writer and reader need to agree on the scratch pad location and on the relative timing for successful communication. |
| EXTERNAL OBJECT | the operand is contained within another symbol. Two integer identifiers are required to specify the operand. The first one points to the particular symbol and the other points to a location within one of the three symbol parameter lists {IL, RL, TL} |
| ORACLE | the operand is in the database. In this case, the SQL substrings are concatenated and the desired data item is extracted from the database using the assembled SQL statement. |
| USER | the operand will be supplied as a text string by a user interface (UIF) device/widget. This is only relevant for Data Sources. |
| WIDGET | the operand is a property of an already-existing widget (which is usually already rendered). Operands may be scalars {I,R,C}, as well as vectors {I,R,C}. Properties are specified by text strings and correspond to the standard Motif widget property definitions (see X11R6 manuals for details) Widget property values may be {I,R,C}. |
| STATUSS | the operand is one of the status variables maintained by IQ_RP, the rule processor. In one embodiment, this class of operands are DATA SOURCE only. These status variables are stored in a data structure called IQ_RP_STATE. This data structure is instantiated in the routines that need it, which are the following: {IQ_RP, IQ_DSDD}. These "STATUS" variables include the following:<br>a. EVENT_FLAG - set whenever an event occurs. Reset each time though the "event loop" by IQ_RP.<br>b. EVENT_LOOP_CTR - Number of times through the "event loop" within IQ_RP. It is updated by IQ_RP and it's reset every time a new screen is retrieved.<br>c. ACTION_LOOP_CTR - Number of times through the "action loop" within IQ_RP. It is updated by IQ_RP and it's reset every time a new screen is retrieved.<br>d. MIN_INTERVAL - (set by IQ_RP_AST)<br>e. OVMS_TIME - Updated by IQ_RP, IQ_RP_AST.<br>f. OVMS_TIME_ASCII - updated by IQ_RP, IQ_RP_AST.<br>g. SCREEN_NAME(*) - holds queue of the previous "n" screens that were displayed. Set by IQ_RP when a new screen is retrieved.<br>h. FILENAME(*) - holds queue of the previous "n" screen filenames that were displayed. Set by IQ_RP when a new screen is retrieved.<br>i. DIRECTORY(*) - holds queue of the previous "n" screen file directories that correspond to the displayed screen files. Set by IQ_RP when a new screen is retrieved.<br>j. RULE_ID(*) - holds queue of the previous "n" rules executed.<br>k. DB_ERROR(*) - holds queue of the previous "n" database access error codes. Queue maintained by IQ_DSDD.<br>l. SQL_EXPANDED(*) - holds queue of the previous "n" SQL statements executed, with the special directives expanded/converted into literals. Queue is maintained by IQ_DSDD.<br>m. SQL_CONTRACTED(*) - holds queue of the previous "n" SQL statements executed, with the special directives "as is"; i.e., NOT converted into literals. Queue is maintained by IQ_DSDD. |

-continued n. RULE_LOC(*) - holds queue of the previous "n" rule locations in the screen buffer whose execution was started. Note that for UIF rules, rule execution may be in progress and therefore not completed.
o. RULE_ID(*) - holds queue of the previous "n" rule IDs in the screen buffer whose execution was started. Note that for UIF rules, rule execution may be in progress and therefore not completed.
p. DB_ERROR(*) - holds queue of the previous "n" database access errors, which are returned from IQ_DB_ORACLE. Queue is maintained by IQ_DSDD.
q. X(*) - holds queue of the previous "n" X-coordinates that were returned from the mouse or other pointing device.
r. Y(*) - holds queue of the previous "n" Y-coordinates that were returned from the mouse or other pointing device.

Note that more DS/DD operand classes may be added as deemed necessary.

Rule & Object Identification

All objects, including rules, reside in the screen buffer, a data structure instantiated as SI(i).<field name>. The field SI(i).ID holds the "ID" of the object. IDs are arbitrary 4-byte integers that are assigned during the configuration process. The IDs of all rules and objects default to their location within the screen buffer, the pointer "i".

All rules are identified by this "ID" field for rule execution. The "Next Rule ID" value contained in a rule also refers to a rule ID for rule chaining. Rules that are triggered by the "On Rule Status" event also reference the "target rule" by its Rule ID, the SI(*).ID field. This field is assigned by the configurator using IQ_BILD or IQ_BILD2.

Because rule and object IDs are arbitrary, there is no simple mapping possible between an object ID and its location within the screen buffer. Rather, a bi-section search algorithm is used to map rule IDs to locations within the screen buffer. The integer*4 function IQ_RULE_LOCATION(TARGET_ID) performs this operation. It is located within the IQ_RP.FOR source file.

Rule Execution Process

The Rule Processor (RP) holds one screen's worth of rules at a time. These rules are stored in the screen buffer, a data structure which consists of multiple fields for rule data, status information and various other parameters (see below for some special SI(*) fields).

Rules are executed one at a time (see below for execution order and control). Internal status bits contains in SI(I).STATUS word. These status bits indicate that an event has occurred, whether or not the action is in progress, whether or not the action has been completed, what button(s) were hit in response to a UIF object, etc. The status bit definitions are given below, taken from IQ_RP.FOR source code:

| Rule Status Bits, Bit | SI(I).STATUS Meaning When Set |
|---|---|
| 0 | Event Occurred |
| 1 | Action is in progress |
| 2 | Action has been completed - only used for "ON RULE STATUS" events as a trigger |
| 3 | User hit "OK" or "APPLY" buttons - applies only for UIF actions |
| 4 | User hit "CANCEL" - applies only for UIF actions |

When an event specified by a rule occurs, the rule is said to be "triggered". IQ_RP looks for these events and then performs the action specified by the triggered rule. If the action is already in progress and has not yet been completed, then the action portion of the rule is NOT executed because it is already ongoing. This prevents "double triggering" of rules.

When the action corresponding to a rule has been taken, the status bits are set to reflect that. Also, whenever a new screen is retrieved, SI(I).STATUS=0 for all status words in the new screen. This prevents erroneous triggering of rules due to the old screen's data.

The actual execution of the actions themselves is handle by a set of subroutines called ACTION_<action_name>, each of which is in its own source file named IQ_RP_<action_name>.FOR. These subroutines are referenced by an array of function pointers, indexed by action code. When a rule is triggered, the value of AV(1) is used to get the function pointer for the subroutine corresponding to that rule's action. This function pointer is then passed to the LIB$CALLG_64 routine, which causes that subroutine to execute.

Rule Execution Process for User I/F (UIF) Devices

Some rules produce UIF devices or widgets. A widget is a "dialog container" with one or more component objects. The dialog container allows the X Server to handle the chores of keyboard entry, parsing, limited cut/paste operations, delete/backspace, repositioning, etc. This frees up IR_RP from having to deal with those issues. Widgets have callbacks, which are routines that are called whenever a UIF button is pushed; e.g., "OK", "CANCEL", "APPLY" and "HELP." The source file IQ_RP.FOR contains these callbacks.

Rules that generate UIF devices operate a little differently. A UIF is generated in response to a rule if it has not already been generated to prevent duplication of UIF devices. When a UIF device is created, the "ACTION IN PROGRESS" status bit is set. This status bit is cleared by the callback because it's the only routine that knows when the action has been completed. UIF widgets create separate program threads automatically per the X11 standard.

Rule Execution Sequence

The rules are now executed in the order set by SI(*).ID field, the "RULE ID". The SI(*).ID is set in IQ Build via two mechanisms. One is to use the "Set P/S/R" option in IQ Build. This applies to non-rule symbols. The second mechanism is to set the "Rule ID" item in the first rule configuration dialog box. This dialog box is coded in the IQ_BILD_RULE.FOR routine.

Special SI(*) Fields for Rule Execution

The SYMBOL_INFORMATION (SI) data structure holds the parameters for each symbol in the screen buffer. Screen buffer symbol IDs (including Rule IDs) are set by the user in IQ Build and saved in the SI(I).ID field. BVC_COMN_FILE writes to special fields in the screen buffer that organize the rules for later execution by the Rule Processor.

The SI(I).ID holds the rule/object ID. These IDs are presently 4-byte integers of arbitrary value. If an ID=00, then BVC_COMN_FILE sets SI(I).ID=I; i.e., it sets the object ID to the value of its location in the screen buffer.

The SI(I).EXECUTION_ORDER field holds the integer order of execution for each rule in the screen buffer, pointed to by index "I". This field is computed and written by BVC_COMN_FILE routine.

The SI(I).EXECUTION_PTR field holds the pointer in the screen buffer of the I-th rule to be executed. This field is also computed and written by BVC_COMN_FILE routine.

The SI(I).NEXT_PTR field holds the location within the screen buffer of the next rule to be executed, if configured that way in IQ Build. This is used for "rule chaining" where the completion of one rule's execution automatically triggers the "event_occurred" bit for another rule. If there is no next rule to be executed, this pointer is set to zero.

Using Widgets as Data Sources and Data Destinations

Widgets have a set of "properties" which control how the widget is displayed. For example, a Text Widget has a property called "value" which contains the text that is displayed in the widget. Similarly, a Scrolled List Widget has a property called "items" which contains the entire list of items in the widget. Scrolled List Widget also has other properties such as "selectedItems", which contains the SET of items which the user has currently selected, and "selectedItemCount", which contains the NUMBER of items the user has currently selected.

When configuring the Data Source or Data Destination involving a widget, there are three items to configure:
1. The RULE ID of the rule which creates the widget,
2. The location within the rule's Text List (i.e. INTERNAL CHAR, must be from 1 through 20) where the property name will be stored,
3. The name of Property of the widget to be transferred. This name is case-sensitive.

Currently, there are only three types of persistent widgets which expose useful properties directly and therefore are useful as Data Sources/Destinations: Pulldown Menu, Scrolled List Widget and Text Widget. Each of these has a different set of properties. Some examples of the most useful properties are as follows:

Scalar TEXT Properties:
value
(Text Widget only) The is the value of the text that is displayed in the Text Widget.
Vector TEXT Properties:
items
(Scrolled List Widget only) This is a vector of all items in the List.
selectedItems
(Scrolled List Widget only) This is vector of any selected items.
Scalar INTEGER Properties:
ItemCount
(Scrolled List Widget only) This is the TOTAL number of items in the List.
SelectedItemCount
(Scrolled List Widget only) This is the number of items that the user has selected.
It can range from zero up to the value of "itemCount".
If multi-select is disabled (the default behavior as of 2009 Sep. 21), it will be either zero or one.
VisibleItemCount
(Scrolled List Widget only) This is the number of items which are currently visible.

For example, suppose we want to transfer the currently-selected item from one Scrolled List Widget to another Scrolled List Widget. Suppose the first List has a Rule ID of 100 and the second List has a Rule ID of 200. We would configure a Data Transfer rule as follows:

For the Data Source (DS):
The Data Type would be "(V) Widget TEXT Property".
The next option would be the Rule ID of the data source. In this case it is 100.
The third option would be the location within the current rule to store the property name.
This must be between 1 and 20. For this example we'll choose 18.
The fourth option is the number of items to transfer. In this case it should be 1.
The property name will be configured on the next DEB.
For the Data Destination (DD):
The Data Type would be "(V) Widget TEXT Property" (again).
The next option would be the Rule ID of the data destination. In this case it is 200.
The third option would be the location within the current rule to store the property name.
This must be between 1 and 20. For this example we'll choose 19.
The fourth option does not need to be configured; the number of items transferred is determined by the data source.
The property name will be configured on the second-next DEB.

Now we can configure the property name for the data source. In this example, we want to transfer the currently selected item. The property name for this is "selectedItems". This name is case-sensitive.

Now we can configure the property name for the data destination. In this example, we want to transfer into the list itself. The property name for this is "items". This name is case-sensitive.

Rule Configuration Overview

IQ_BILD supports the graphical setting up of rules. The IQ_BILD_RULE subroutine contains the rule setup DEBs and parameter assignments. The BVC_COMN_FILE subroutine controls the reading/writing of the rules, which currently are embedded as part of the .BXB screen file.

The Rule processor uses the "Reference Monitor" security rules where required for proper enforcement. A portion of the rule parameters contain "O/S permission" parameters, "users allowed" parameters and "access mode" parameters. The security processing is done in one place so that it is easy to test, verify and modify.

Supported Data Operands for Actions & Events

The following operands are allowed for each action or event. This list indicates what is configurable in IQ_BILD. This may or may not agree with what is supported by IQ_RP. In other words, the ability to configure in BILD is independent of what is supported by current versions of IQ_RP. This includes the ability to specify multiple Data Sources as Oracle CHAR.

In the following table, the following classes are defined:

| | |
|---|---|
| Simple Scalar | {Internal INTEGER, Internal REAL, Internal CHAR, MADT INTEGER, MADT REAL, MADT CHAR, Scratch Pad INTEGER, Scratch Pad REAL, Scratch Pad CHAR, Ext. Object INTEGER, Ext. Object REAL, Ext. Object CHAR, Oracle INTEGER, Oracle REAL, Oracle CHAR |
| Simple Vector | {(V) Internal INTEGER, (V) Internal REAL, (V) Internal CHAR, (V) MADT INTEGER, (V) MADT REAL, (V) MADT CHAR, (V) Scratch Pad INTEGER, (V) Scratch Pad REAL, (V) Scratch Pad CHAR, (V) Ext. Object INTEGER, (V) Ext. Object REAL, (V) Ext. Object CHAR, (V) Oracle INTEGER, (V) Oracle REAL, (V) Oracle CHAR} |
| User Scalar | {USER INTEGER, USER REAL, USER CHAR} This operand only makes sense as a special directive in SQL strings. It should never be directly configurable |

-continued

| | |
|---|---|
| User Vector | as a DS or DD<br>{(V) USER INTEGER, (V) USER REAL, (V) USER CHAR}<br>This operand only makes sense as a special directive in SQL strings. It should never be directly configurable as a DS or DD |
| Widget Scalar | {Widget INTEGER property, Widget REAL Property, Widget TEXT Property} |
| Widget Vector | {(V) Widget INTEGER property, (V) Widget REAL Property, (V) Widget TEXT Property} |
| Status Scalar | {OVMS Time (I8), OVMS Time (C23), Event Loop Ctr, Action Loop Ctr} |
| Status Vector | {(V) Screen Name, (V) Filename, (V) Directory, (V) Rule Location, (V) Rule ID, (V) DB Errors, (V) SQL Expanded, (V) SQL Contracted, (V) X-Mouse, (V) Y-Mouse} |
| Multi-SQL | indicates that multiple SQL Data Sources are supported. This is not applicable to Data Destinations, or actions/events with only one Data Source. If multiple SQL Data Sources are supported, then a 'Y' is shown for all DS in the rule which can be SQL |

In general, "Y" indicates that all elements of that class are supported; "X" indicates partial support. An "N" or "N/A" indicates that none of the elements in that class are supported. Non-support could indicate that—the class is meaningless, irrelevant or not deemed useful enough to be implemented at current versions. In the event that a particular DS or DD supports only a subset of the one of the above classes, then the non-supported items are listed individually in that entry. "Scalar," "Vector" or "Both" indicate that the DS/DD class is supported even if meaningless in present context.

In the case of a scalar-only DS (such as "Directory DS" for the Get Screen action), specifying some vector sources is still allowed, since certain items (such as a widget's "selectedItems" property) only exist as vectors. In these cases, the first element in the vector is used as the data source.

TABLE

Supported Data Operands for Actions & Events

| Action/Event DS or DD | Simple Scalar | Simple Vector | User Scalar/Vector | Multi SQL | Widget Scalar | Widget Vector | Status Scalar | Status Vector |
|---|---|---|---|---|---|---|---|---|
| ACTION CODE = 1; Get a Screen | | | | | | | | |
| Filename DS | Y | N | N | N | Y | Y | Y | Y |
| Directory DS | Y | N | N | N | Y | Y | Y | Y |
| ACTION CODE = 2; Data Transfer | | | | | | | | |
| DS | Y | Y | N | N/A | Y | Y | Y | Y |
| DD | Y | Y | N | N/A | Y | Y | N | N |
| ACTION CODE = 3; Use Scrolled Text | | | | | | | | |
| Text DS | Y | N | N | N | N | N | Y | Y |
| Title DS | Y | N | N | N | N | N | N | N |
| DD | Y | N | N | N/A | N | N | N | N |
| ACTION CODE = 4; Use File Select Dialog | | | | | | | | |
| Pattern DS | Y | N | N | N | N | N | Y | Y |
| Directory DS | Y | N | N | N | N | N | Y | Y |
| Dialog Title DS | Y | N | N | N | N | N | N | N |
| DD | Y | N | N | N/A | N | N | N | N |
| ACTION CODE = 5; Use Prompt Dialog | | | | | | | | |
| Prompt DS | Y | N | N | N | Y | Y | Y | Y |
| Title DS | Y | N | N | N | N | N | N | N |
| Selection DS | Y | N | N | N | N | N | N | N |
| DD | Y | N | N | N/A | N | N | N | N |
| ACTION CODE = 6; Use Information Dialog | | | | | | | | |
| Info DS | Y | N | N | N | Y | Y | Y | Y |
| Title DS | Y | N | N | N | N | N | N | N |
| Info Symbol DS | Y | N | N | N | N | N | N | N |
| ACTION CODE = 7; Use Selection Dialog | | | | | | | | |
| List Items DS | Y | Y | N | N | N | N | Y | Y |
| List Label DS | Y | N | N | N | N | N | N | N |
| Selection Label DS | Y | N | N | N | N | N | Y | Y |
| Dialog Title DS | Y | N | N | N | N | N | N | N |
| DD | Y | N | N | N/A | N | N | N | N |
| ACTION CODE = 8; Use Push Button | | | | | | | | |
| DS | Y | Y | N | N | Y | Y | Y | Y |
| Label DS | Y | N | N | N | N | N | N | N |
| DD | Y | Y | N | N/A | Y | Y | N | N |
| ACTION CODE = 9; Use DEB | | | | | | | | |
| Cell DS | Y | Y | Both | N/A | N | N | X | Y |
| Cell DD | Y | N | N | N/A | N | N | N | N |

TABLE-continued

Supported Data Operands for Actions & Events

| Action/Event DS or DD | Simple Scalar | Simple Vector | User Scalar/Vector | Multi SQL | Widget Scalar | Widget Vector | Status Scalar | Status Vector |
|---|---|---|---|---|---|---|---|---|
| ACTION CODE = 10; Update & Redraw Symbol | | | | | | | | |
| DS | Y | Y | N | N/A | Y | Y | Y | Y |
| DD | Y | Y | N | N/A | Y | Y | N | N |
| ACTION CODE = 11; Do O/S Command | | | | | | | | |
| CMD Str 1 | Y | N | N | N | N | N | N | N |
| CMD Str 2 | Y | N | N | N | N | N | N | N |
| CMD Str 3 | Y | N | N | N | N | N | N | N |
| CMD Str 4 | Y | N | N | N | N | N | N | N |
| CMD Str 5 | Y | N | N | N | N | N | N | N |
| ACTION CODE = 12; GOTO Rule X | | | | | | | | |
| DS1 Source | Y | N | N | N | N | N | N | N |
| DS2 Source | N | Y | Vector | N | N | N | X | Y |
| ACTION CODE = 13; Use Pulldown Menu | | | | | | | | |
| Menu Title DS | Y | N | Scalar | N | N | N | N | N |
| Option #1 ... 10 DS | Y | N | N | N | N | N | N | N |
| Rule ID #1 ... 10 DS | Y | N | N | N | N | N | N | N |
| ACTION CODE = 14; Use Scrolled List | | | | | | | | |
| List Items DS | Y | Y | N | N | N | N | Y | Y |
| List Label DS | Y | N | N | N | N | N | N | N |
| Dialog Title DS | Y | N | N | N | N | N | N | N |
| ACTION CODE = 15; Destroy Persistent Widget | | | | | | | | |
| Rule ID of Widget DS | Y | Y | N | N/A | N | N | Y | Y |
| ACTION CODE = 16; Exit the system | | | | | | | | |
| This action has no data sources! | | | | | | | | |
| ACTION CODE = 17; Use Text Widget | | | | | | | | |
| Text DS | Y | N | N | N/A | N | N | Y | Y |
| ACTION CODE = 18; Use Scrolled List Widget | | | | | | | | |
| List Items DS | Y | Y | N | N/A | N | N | Y | Y |
| DD | Y | Y | N | N/A | N | N | Y | Y |
| ACTION CODE = 19; Use Arrow Button | | | | | | | | |
| DS | Y | N | N | N | N | N | N | N |
| DD | Y | N | N | N/A | N | N | N | N |
| ACTION CODE = 20; Use Popup Menu | | | | | | | | |
| Menu Title DS | Y | N | Scalar | N | N | N | N | N |
| Option #1 ... 10 DS | Y | N | N | N | N | N | N | N |
| Rule ID #1 ... 10 DS | Y | N | N | N | N | N | N | N |
| EVENT CODE = 3; Data Comparison | | | | | | | | |
| DS1 | Y | N | N | N | N | N | X | Y |
| DS2 | Y | N | N | N | N | N | N | N |
| EVENT CODE = 8; String Comparison | | | | | | | | |
| DS1 | Y | N | N | N | N | N | N | N |
| DS2 | N | Y | N | N | N | N | N | N |

Event Definitions

The allowed set of events and actions provide the raw capabilities for an exemplary system. This list may be amended and it is expected that additional events and actions may be added to meet desired needs. Also contained in this list are the items required to fully specify each event and each action.

| Event List & Description | |
|---|---|
| 0. NULL event = No event. | This rule cannot trigger itself. Rather, it is triggered by another rule via the "Next Rule ID" field. NULL events are ignored by IQ_RP. |
| 1. Left MB pressed on an object. | This event occurs when the left (or only) mouse button is pressed over the specified RULE object. The RULE object's geometry determines the region of interest for the mouse button press. |
| 2. Key press. | This event occurs when the "keypress input" matches the desired key sequence, if specified. The key sequence may be an ASCII byte stream or an XLIB "key symbol code" which is 16-bits. |

| Event List & Description | |
|---|---|
| 3. Comparison operation. | This event occurs whenever <data object #1> <comparison> <data object #2> = TRUE. The data objects are generic and may one of {INTERNAL, MADT, SCRATCH PAD, EXERNAL, ORACLE, STATUS}. The data types may be one of {INTEGER, REAL, CHARACTER}. The datatypes may be mixed as desired because conversions are automatic. When doing character comparisons, numbers come before letters and letter are in alphabetical order. Thus, "B23" < "C23" and "1234" < "ABCD". |
| 4. Status of rule "i". | This event occurs when the status bits of rule "i" are set to the desired "bit mask". In one embodiment, the only status bit looked at is bit #2 which signifies "action completed". The rule status bits are defined in the event parameter table below. |
| 5. Periodically. | The event occurs when a "periodic timer" expires. This event causes the specified action to occur on a regular basis at preset intervals. |
| 6. Mouse click in window. | This event occurs when the left (or only) mouse button is pressed anywhere within the work window. |
| 7. On Load event. | This event occurs when a screen is initially loaded. This condition is sensed by the IQ_RP.FOR internal counter ACTION_LOOP_CTR. This variable is I*8 and is incremented each time the RULE actions are processed. When a new screen is retrieved, this counter is reset to zero. |
| 8. String Comparison Operations. | Two sets of strings are compared. The event occurs if the comparison is "TRUE". Scalar-to-vector string comparison or other comparisons may be supported. Exemplary string comparison operations are listed below:<br>a) "Exact Match". The event occurs if the first operand string exactly matches the second operand string for both contents and length.<br>b) "Case Blind Compare". The event occurs if the first operand string matches the second operand string - case-insensitive.<br>c) "Match Wild". The event occurs if the first operand string (with {%,*} wildcards) matches the second operand string. The {*} wildcard equates to zero or more characters. The {%} wildcard equates to exactly one character.<br>d) Does NOT match. The inverse of EXACT match. Strings are either unequal in length and/or their contents do not match.<br>e) "Find First In Set". The event occurs if any one (or more) of the characters in first operand appear in the set of characters described by the second operand.<br>f) "Find First Not In Set". The event occurs if any one (or more) of the characters in first operand do NOT appear in the set of characters described by the second operand. |
| 9. Right MB pressed on an object. | This event occurs when the right mouse button is pressed over the specified RULE object. The RULE object's geometry determines the region of interest for the mouse button press. |
| 10. Left MB released on an object. | This event occurs when the left mouse button is released over the specified RULE object. The RULE object's geometry determines the region of interest for the mouse button release. |
| 11. Right MB released on an object. | This event occurs when the right mouse button is released over the specified RULE object. The RULE object's geometry determines the region of interest for the mouse button release. |
| 12. Left MB Motion Over Area. | Event occurs when the left MB is held down while the pointer is moving over the area specified by the RULE_1 symbol. This area can be defined either implicitly (by the area occupied by the RULE_1 symbol itself) or explicitly, as specified by additional event parameters. Any button release stops the event. This is a "persistent event" in that it can occur over many cycles through the event/action loop(s) of IQ_RP. |
| 13. Right MB Motion Over Area. | Event occurs when the right MB is held down while the pointer is moving over the area specified by the RULE_1 symbol. This area can be defined either implicitly (by the area occupied by the RULE_1 symbol itself) or explicitly, as specified by additional event parameters. Any button release stops the event. This is a "persistent event" in that it can occur over many cycles through the event/action loop(s) of IQ_RP. |
| 14. Pointer Motion Over Area. | Event occurs when the pointer is moving over the area specified by the RULE_1 symbol. This area can be defined either implicitly (by the area occupied by the RULE_1 symbol itself) or explicitly, as specified by additional event parameters. Any button release stops the event. This may be structured as a "persistent event" in that it can occur over many cycles through the event/action loop(s) of IQ_RP. |
| 15. On Exit (screen or system) | Event occurs before any GET SCREEN or EXIT SYSTEM action. It is only relevant for GET SCREEN or EXIT SYSTEM actions which have been configured to allow "on exit" events; for everything else, it is ignored. |

Rule Chaining & "Next Rule ID"

A rule can be configured to cause the "triggering" (and hence cause the execution) of another rule. For Non-User I/F rules (rule having actions that do not request user input), this happens whenever the "Next Rule ID" field of the RULE_1 symbol is nonzero. Upon completion of the current rule, the event flag of the rule specified by the "Next Rule ID" field is set to TRUE. So, the next time through the rule processor's "action loop", the "Next Rule ID" rule is executed.

For User I/F rules, rule chaining happens whenever the "Next Rule ID" field of the RULE_1 symbol is nonzero—AND—the rule's "OK Callback" was activated. As before, when the action of the current rule is completed, the event flag of the rule specified by the "Next Rule ID" field is set to TRUE. So, the next time through the rule processor's "action loop", the "Next Rule ID" rule is executed. If the "Cancel"

callback was activated, then no rule chaining occurs. IQ_BIL-D_RULE allows the setting of this "Next Rule ID" field for each rule action.

This rule chaining is presently implemented in the following way. The user/configurator sets the desired "target rule ID" in IQ Build. This rule ID value is stored in SI(I).IL (NEXTP). Every time that a screen is saved, the BVC_COMN_FILE routine looks at all of these Rule IDs and automatically finds their respective locations within the screen buffer. Then, BVC_COMN_FILE writes these location to the SI(I).NEXT_PTR field. This process—and this screen buffer field, is not visible to the user/configurator. In this manner, the arbitrarily assigned "Rule IDs" are automatically converted to pointers that are used by IQ_RP to quickly located the desired target rule.

Additional Event Triggering Conditions

IQ_RP supports "conditional event/rule triggering". This means that a rule may be set to trigger only upon a Boolean combination of the "core event" (specified in the event table above) and other "extra conditions", which are specified during system configuration. The "extra condition" may be a data comparison between two data sources, DS #1 and DS #2. These data sources are defined in the usual DD/DS way (see the data source and/or destination tables below).

The pointer to the extra event triggering conditions are stored in EV(2), the second event parameter. If EV(2)>0, then it points to the location within the symbol's integer list SI(i).IL(j) which is the start of the extra event triggering condition parameters; i.e., EV(2)=j, the start of the parameters for the extra triggering conditions.

Operationally, IQ_RP checks for the specified "core events", listed in the event table above. If an event occurs, it is flagged as having occurred. Once all of the events have been tested and flagged, IQ_RP then checks only the flagged events for any other conditions specified for that event. If the "other condition" is satisfied, then the rule remains triggered. If the extra condition is not satisfied, then the rule is "untriggered"—so its action is not taken.

Thus the "extra condition" is logically ANDed together with the "core event" when deciding whether or not to trigger an event. Events are considered to have "occurred" if and only if all components of the event are "TRUE" (the core event and the extra condition). The supported "extra condition" is of the following form:

<DS #1><compare op and/or math op><DS #2>=TRUE

The data objects are specified in the same manner as the Data Source (DS) parameters, defined for scalars, vectors and arrays. The comparison operations may include arithmetic operations, lexicographic operations, vector operations and others to be added as required. There are lots of options that can be added here.

The DS data types may be one of {INTEGER, REAL, CHARACTER}. For STATUS DS, the datatypes are determined by the specific status variable used as the DS. The datatypes may be mixed as desired because the data type conversions are automatic. When doing character comparisons, numbers come before letters and letter are in alphabetical order. Thus, "B23"<"C23" and "1234"<"ABCD". Exemplary supported data comparison codes & corresponding operations are listed in the table below:

| | "Extra Condition" Event Triggering Parameters | | | |
| --- | --- | --- | --- | --- |
| Operation Code | Meaning when DS1, DS2 are scalars | Meaning when DS1, DS2 are vectors | Meaning when DS1 is a scalar & DS2 is a vector | Meaning when DS1 is a vector & DS2 is a scalar |
| 0 | No operation | No operation | No Operation | No operation |
| 1 | DS1 < DS2 | DS1(i) < DS2(i) for all vector elements. Comparison is done only up to the length of the shortest vector. | DS1 < DS2(i) for all vector elements of DS2 | DS1(1) < DS2 for all vector elements of DS1 |
| 2 | DS1 <= DS2 | DS1(i) <= DS2(i) for all vector elements. Comparison is done only up to the length of the shortest vector. | DS1 <= D52(i) for all vector elements of DS2 | DS1(i) <= DS2 for all vector elements of DS1 |
| 3 | DS1 = DS2 | DS1(i) = DS2(i) for all vector elements. Comparison is done only up to the length of the shortest vector. | DS1 = DS2(i) for all vector elements of DS2 | DS1(i) = DS2 for all vector elements of DS1 |
| 4 | DS1 >= DS2 | DS1(i) >= DS2(i) for all vector elements. Comparison is done only up to the length of the shortest vector. | DS1 >= DS2(i) for all vector elements of DS2 | DS1(i) >= DS2 for all vector elements of DS1 |
| 5 | DS1 > DS2 | DS1(i) > DS2(i) for all vector elements. Comparison is done only up to the length of the shortest vector. | DS1 > DS2(i) for all vector elements of DS2 | DS1(i) > DS2 for all vector elements of DS1 |
| 6 | DS1 <> DS2 | DS1(i) <> DS2(i) for all vector elements. Comparison is done only up to the length of the shortest vector. | DS1 <> DS2(i) for all vector elements of DS2 | DS1(i) <> DS2 for all vector elements of DS1 |

Action Definitions

The allowed set of events and actions provide the raw capabilities the system. This list is merely exemplary as currently configured and may change as development or needs dictate.

The presently allowed actions are described in the numbered list below. Note that most actions will have data source and data destination specifiers. These specifiers will determine where data is obtained and where it is put when the action is completed.

| Action List & Description | |
|---|---|
| 1. Get A Screen. | The screen specified by the data source parameters will be retrieved. This screen retrieval process will "load up" the rule structure with the rules for that screen. The scratch pad area may be cleared out so that "stale data" does not contaminate the new screen, which may use the SP for its operation. The Screen Exit code is a BWS which describes which actions must be taken before retrieving a new screen. Note: "onExit Rule" means "a rule which has an event of 'On Exit'". |
| 2. Data Transfer. | The "operand" specified by the data source (DS) parameters is transferred to the location specified by the data destination (DD) parameters. As part of the transfer, algebraic operations may be performed on the DS. The desired arithmetic operation is specified by AV(3). Before writing the DS to the DD, the DS is used in a formula to compute the DD value to be written. This only applies to integer/real DS parameters. The supported operations may include the following:<br>(a) Do Nothing. DD = DS;<br>(b) Linear Conversion. DD = C1*(DS) + C2;<br>(c) Quadratic conversion. DD = C1*(DS)^2 + C2*(DS) + C3;<br>(d) Replicate. DD(Vector) = DS(Scalar) for each element of the DD vector;<br>(e) Word Set (bit-wise OR operation) DD = DS (OR) C1 where constant C1 is preconverted into an integer and then is bitwise OR'ed with DS to produce the DD value;<br>(f) Word Clear (bit-wise AND NOT operation) DD = DS (AND NOT) C1 where constant C1 is pre-converted into an integer and then is bitwise negated then ANDed with DS to produce the DD value; and<br>(g) Word Toggle (Bit-wise XOR operation) DD = DS (XOR) C1 where Constant C1 is pre-converted into an integer and then is bitwise XOR'ed with DS to produce the DD value. |
| 3. Use Scrolled Text. | The title string will appear on the top of the scrolled text box. The DS will appear within the scrollable window and will be editable. Once edited by the user, the text will be written to the destination specified by the DD parameters |
| 4. Use File Selection Box. | The "pattern string", directory and selection label are all user-settable per the IQware standard data source (DS) parameters. The pattern string is the "mask" for selecting a group of files, *.FOR or *ABC*.DAT. The directory may be physical of a logical pointer, e.g., IQ$MTM:. The selection label is simply a string that describes what is being selected. |
| 5. Use Prompt Dialog. | A dialog box is displayed with some initial text, specified by the data source (DS) parameters. The user can edit this text string and then save it as specified by the data destination (DD) parameters. The DS operand is always converted to a string for editing. The edited string is always converted automatically to the DD data type {I,R,C}. |
| 6. Use Information Dialog. | An "information" dialog box is displayed with some message text, specified by the data source (DS) parameters. This string is non-editable and there is no data destination for it. |
| 7. Use Selection Dialog. | A list of items is displayed in a scrollable selection dialog widget. The data source (DS) parameters specify the list of items, along with action parameters AV(3) and AV(4). AV(3) is the item list count, or the maximum number of items allowed. AV(4) is the item list "start pointer", for non-Oracle item lists. If the data source (DS) is oracle, then the SQLS parameters determine the list of items displayed. The selected item from the list is saved as specified by the data destination (DD) parameters. The list item is always converted automatically to the DD data type {I,R,C}. |
| 8. Use Push Button. | A Push Button is displayed that may activate another rule, as specified by the NEXT RULE ID field. The push button also transfers data from the DS to the DD. As part of that transfer, arithmetic and / or logical operations may be performed on the DS. Before writing the DS to the DD, the DS is used in a formula to compute the DD value to be written. This only applies to integer/real DS parameters. The supported operations may include the following:<br>(a) Do Nothing. DD = DS;<br>(b) Linear Conversion. DD = C1*(DS) + C2;<br>(c) Quadratic conversion. DD = C1*(DS)^2 + C2*(DS) + C3;<br>(d) Replicate. DD(Vector) =DS(Scalar) for each element of the DD vector;<br>(e) Word Set (bit-wise OR operation). DD = DS (OR) C1. Constant C1 is pre-converted into an integer and then is bitwise OR'ed with DS to produce the DD value;<br>(f) Word Clear (bit-wise AND NOT operation). DD = DS (AND NOT) C1 where constant C1. is pre-converted into an integer and then is bitwise negated then ANDed with DS to produce the DD value;<br>(g) Word Toggle (Bit-wise XOR operation). DD = DS (XOR) C1 where constant C1 is pre-converted into an integer and then is bitwise XOR'ed with DS to produce the DD value. |
| 9. Use DEB. | Display a generic DEB with each cell user-specified in IQ_BILD_RULE. Note that each cell can have different DS/DD parameters. The DEB is a container widget which is organized as a rectangular array of user interface widgets and possibly gadgets. Because the DEB requires a large amount of data to completely specify it, the DEB specification information is contained within a binary file. The binary file is "pointed to" by the RULE_1 symbol. |

-continued

| Action List & Description | |
|---|---|
| | Exemplary widgets/gadgets supported in the DEB are listed:<br>(a) IQ_DEB_EMPTY_TYPE - An empty DEB cell, i.e. no discernible UI Widget is displayed;<br>(b) IQ_DEB_SEPARATOR_TYPE - A separator cell where the value for LabelString is optional and InitStringValue is ignored;<br>(c) IQ_DEB_TEXT_FIELD_TYPE - Single-line text field UI Widget;<br>(d) IQ_DEB_SCROLL_TEXT_TYPE - A scrollable text field UI Widget;<br>(e) IQ_DEB_SELECT_BOX_TYPE - A selection box UI Widget;<br>(f) IQ_DEB_FILE_SELECT_BOX_TYPE - A file selection box UI Widget.<br>(g) IQ_DEB_RADIO_BOX_TYPE - A radio box widget, that may contain toggle-able entries. |
| 10. Update & Redraw Symbol. | The specified symbol is "updated" with the DS value(s) and repainted. This action is similar to data transfer action except that IQ_DSDD is only used to GET operands, not to "PUT" operands. Rather, each symbol is individually handled by mapping the DS operands to the proper spots in the symbol's real list so that the values are properly placed. This is required because the destination of the DS operands in not contiguous within the symbol's real list. This is true for all symbols that are part of BVC_GRAPHICS, although changes may be made without departing from the spirit of the invention. |
| 11. Do O/S Command. | Execute an OVMS Operating System DCL (Digital Command Language) command. The DCL command is a string that is assembled at run time. It is assembled from concatenating up to five data sources (DS). Spaces are added after each data source "substring" so that they can be used as command "arguments" to an executable image or an existing DCL "*.COM" procedure (e.g., P1, P2, P3, etc.). Note that all the data sources are scalars and hence require three integer DS parameters each to fully specify. The commands are issued using the LIB$SPAWN routine. In addition the the command to be spawned, this routine is passed six additional parameters. These parameters are: the NOWAIT flag, which caused the spawned command to be executed concurrently with RP rather than causing RP's process to be held until the command completes; the address of an integer variable to hold the PID of the spawned command; the address of an integer variable to hold the return status of the spawned command; the address of an X-Windows I/O Event Flag, which causes the OSCommandComplete procedure to be run when the command completes; the address of an AST routine, MarkCommandCompleted; and the value of the parameter to MarkCommandCompleted, which is the address of the queue entry corresponding to the rule which spawned the command. The MarkCommandCompleted routine and OSCommandComplete routine work |

-continued

| Action List & Description | |
|---|---|
| | together to manage a queue of "completed commands". MarkCommandCompleted adds commands to the queue as they are completed, and OSCommandComplete processes the completed commands. This processing currently includes setting the "Action Completed" bit and auditing the command if the rule is configured to do so, but additional processing may be added. |
| 12. Goto Rule "X". | This action is used to implement "decision diamonds" in a flowchart. This action performs an arithmetic, logical or data analysis operation on one or more operands (DS1, DS2) and gets a result. The result is then "mapped" by the user-selected mapping algorithm to a so-called "Target Rule ID". The mapping algorithm is controlled by one or more "mapping parameters", some of which may not be needed. The "EVENT OCCURRED" bit is set to TRUE for that Rule ID. This will cause the execution of the target rule on either the current or subsequent pass of the "Action Loop" of the rule processor. |
| 13. Create Pulldown Menu. | This action implements a "top menu" within the menu bar and then a set of one or more pulldown menu options. When invoked, these menu options transfer control to a callback with causes the execution of the selected rule. In other words, each menu option really is a pointer that causes a rule to be executed. The specific pointer value, and the corresponding rule, are configured by the user. Each menu option's text and associated rule pointer are specified by the usual DS/DD parameters and are all scalars. |
| 14. Use Scrolled List. | Similar to Use Selection dialog, but without any selection allowed. A list of items is displayed in a scrollable list dialog widget. The data source (DS) parameters specify the list of items, along with action parameters AV(3) and AV(4). AV(3) is the item list count, or the maximum number of items allowed. AV(4) is the item list "start pointer", for non-Oracle item lists. If the data source (DS) is oracle, then the SQLS parameters determine the list of items displayed. No selection of any item is allowed so there are no data destination parameters. |
| 15. Kill persistent widget. | This action destroys a persistent widget that was previously created by a rule action. The ID of the rule that created the widget is used to locate the widget ID within either the G_WIDGET(*) or P_WIDGET(*) structures. The widget is then destroyed. Note, some UIF devices like pull down menus create multiple widgets which need to be destroyed. |
| 16. Exit The System. | This action exits the operation of the rule processor. All persistent widgets are killed and all pending data writes are immediately terminated. The Screen Exit code is a BWS which describes which actions must be taken before leaving the system. |
| 17. Use Text Widget. | This action displays a text widget that persists until explicitly killed by another action and/or upon retrieval of a new screen. It can be used for a "tool tip" or other temporary status indicator. |

-continued

| Action List & Description | |
|---|---|
| 18. Use Scrolled List Widget. | This action displays a scrolled list widget that persists until explicitly killed by another action and/or upon retrieval of a new screen. It can be used to display a list of information that is not intended to be edited, but must appear for user reference. |
| 19. Use Arrow Button. | An Arrow Button is displayed that activates another rule, specified by the NEXT RULE ID field. The arrow button also transfers data from the DS to the DD. As part of that transfer, arithmetic and / or logical operations may be performed on the DS. Before writing the DS to the DD, the DS is used in a formula to compute the DD value to be written. This only applies to integer/real DS parameters. The supported operations are the following:<br>(a) Do Nothing. DD = DS;<br>(b) Linear Conversion. DD = C1*(DS) + C2;<br>(c) Quadratic conversion. DD = C1*(DS)^2 + C2*(DS) + C3;<br>(d) Replicate. DD(Vector) = DS(Scalar) for each element of the DD vector;<br>(e) Word Set (bit-wise OR operation). DD = DS (OR) C1 where constant C1 is pre-converted into an integer and then is bitwise OR'ed with DS to produce the DD value;<br>(f) Word Clear (bit-wise AND NOT operation). DD = DS (AND NOT) C1 where constant C1 is pre-converted into an integer and then is bitwise negated then ANDed with DS to produce the DD value; and<br>(g) Word Toggle (Bit-wise XOR operation). DD = DS (XOR) C1 where constant C1 is pre-converted into an integer and then is bitwise XOR'ed with DS to produce the DD value. |
| 20. Create Popup Menu. | This action creates a popup menu wherever the rule is located on the screen. When a popup menu option is selected by the user, the callback triggers the rule ID corresponding to that popup menu option. The menu text strings are specified by the DS parameters. The Rule IDs corresponding to those menu options are also specified by the DS parameter. The Menu Text Strings (MTSs) and corresponding Target Rule IDs (TRIDs) are specified at Popup Menu (PDM) creation time. |
| 21. ASCII File Output. | Save the DS in an ASCII file. Structure of the file is specified by additional parameters. |
| 22. Audit an event. | This causes a timestamp, user ID and other relevant information to be saved for later review and reporting. |
| 23. Alter/set object security and access levels. | Alter/set object security and access levels. |
| 24. Grant/revoke privileges at the O/S level. | Grant/revoke privileges at the O/S level. |
| 25. Alter quotas at the O/S level. | Alter quotas at the O/S level. |

Under "9. Use DEB" some of the widgets and gadgets within the DEB support editing of text strings. For those that support this editing the DEB_CELL(I,J).OPTIONFLAGS variable is a BWS which determines what, if any, input is accepted by the widget. If no bits are set, i.e., DEB_CELL(I,J).OPTIONFLAGS=0, then the widget is not editable and no input will be accepted. The specific bit descriptions are defined in the table below:

| Bit | Meaning When Set |
|---|---|
| 0 | Allow the digits 0-9 and the minus (−) sign. |
| 1 | Allow the exponent symbols "E", "e" and the decimal point ".". |
| 2 | Allow the characters a-z and A-Z inclusive. Do not do any case conversion. |
| 3 | Force all alphabet characters to upper case. |
| 4 | Force all alphabet characters to lower case. |
| 5 | Allow the space " " character. |
| 6 | Allow the star "*" character. |
| 7 | Allow all printable characters between ASCII 32 and ASCII 126 inclusive. |
| 8 | Do not echo the characters to the screen. A star (*) is printed instead of the characters entered. This is useful for security information such as passwords. |

Under "16. Exit the System" the "on Exit Rule" means "a rule which has an event of 'On Exit'". The meaning of the bits are described below:

| Bit | Meaning When Set |
|---|---|
| 0 | Wait for onExit Rules to complete |
| 1 | Wait for pending UIF devices to complete |
| 2 | Wait for other rules to complete |
| 3 | Allow rule chaining |
| notes 1) | "Wait for onExit Rules to complete" indicates two things:<br>a) That the "event occurred" flag should be set for all onExit rules<br>b) All onExit rules must be completed before continuing. |
| 2) | If "allow rule chaining" is false, then the new screen will be retrieved as soon as the currently-executing rules and all of the just-flagged onExit rules have completed, regardless of whether or not these rules are part of a chain. |
| 3) | If bits 0, 1, and 2 are all clear, then bit 3 must be clear also |

Under "19. Use Arrow button" the visual attributes of an arrow button are mapped in the following way:
arglist(4).name=% LOC(XmNbackground)
arglist(4).value=xi.pixels(si(i).il(11)+1) !RULE fill color inner box
arglist(5).name=% LOC(XmNforeground)
arglist(5).value=xi.pixels(si(i).il(16)+1) !RULE text color
arglist(6).name=% LOC(XmNhighlightColor)
arglist(6).value=xi.pixels(si(i).il(14)+1) !RULE fill color middle box
arglist(7).name=% LOC(XmNarrowDirection)
if (av(3) .eq. 0) arglist(7).value=XmARROW_LEFT
if (av(3) .eq. 1) arglist(7).value=XmARROW_RIGHT
if (av(3) .eq. 2) arglist(7).value=XmARROW_UP
if (av(3) .eq. 3) arglist(7).value=XmARROW_DOWN Action Cleanup Options After an action has been completed, some data source "cleanup" may be required. As an example, this cleanup may involve clearing out the data source(s) for a comparison operation so that it is not re-triggered. This cleanup may also require setting/clearing rule status bits, etc. The table below lists the options that are available for rule action cleanup. This "action cleanup word" is presently a 4-byte BWS and it is stored in AV(2) the second action parameter. In this embodiment, all actions require at least two parameters for complete specification.

Some actions produce a user interface (UIF) widget. The usual action "cleanup" in this case is to destroy the widget after use. Alternately, the widget may be destroyed when a new screen is rendered or may be allowed to persist until explicitly destroyed by another action. The desired disposal behavior is specified by bits #7 and #8 of the action cleanup BWS. Bit #7 specifies the widget persistence (0=destroy after first use and 1=persist beyond first use). Bit #8 specifies the destruction method (0=destroy when new screen is retrieved, 1=keep widget until explicitly destroyed by another action).

| Action Cleanup Bit Assignments | Meaning of Bit (When Set = 1) |
|---|---|
| 0 | NONE (no cleanup). Note that if the entire BWS = 0 then this also means NO ACTION CLEANUP. |
| 1 | Clear out event data source #1. This is generally used for ON DATA COMPARISON events. "Clear out" means set the values for {I, R, C}datatypes to 0, 0.0, NULL respectively. |
| 2 | Clear out event data source #2. This is generally used for ON DATA COMPARISON events. |
| 3 | Clear out action data source #1. As with event data sources, "clear out" means set the values for {I, R, C} datatypes to 0, 0.0, NULL respectively. |
| 4 | Clear out action data source #2. |
| 5 | Clear out action data source #3. |
| 6 | Clear out the "ACTION COMPLETED" rule status bit for the "target" rule. This applies to rules that execute when another rule's status bit(s) is(are) set. For such rules, EV(3) points to the "target" rule which is the rule whose status bits are to be tested. The action completed bit (bit #2 of the status word) is cleared out. Also, the other "action completed-related" bits of the rule status word are cleared. These are the OK BUTTON HIT (rule status bit #3) and the CANCEL BUTTON HIT (rule status bit #4). |
| 7 | Widget persistence (only applies to UIF widgets). 0 => destroy the widget after first use (i.e., within a callback routine). 1 => do not destroy the widget after first use. |
| 8 | Widget disposal (only applies to UIF widgets). 0 => destroy the widget when a new screen is retrieved. 1 => do not destroy the widget because it will be explicitly destroyed by an specific action. The action to destroy a widget will use the ID of the rule that created the persistent widget. So, all persistent widgets should have unique rule IDs throughout the entire rule system! |

Rule Status Bits

Each rule presently has a 4-byte status word associated with it. This 4-byte integer tracks the status of the rule and is used for both IQ_RP's "internal housekeeping" as well as for conditioning other events. As an example, Rule "i" can be set to trigger upon the completion of Rule "j". The table below lists exemplary Rule status bits and their meanings.

| Rule Status Bit Assignments | Meaning of Bit (When Set = 1) |
|---|---|
| 0 | The event for Rule "i" occurred. IQ_RP "event code block" sets this bit. The IQ_RP "action code block" clears this bit. For UIF objects, this bit is cleared after the UIF object is rendered but before the action is completed. This bit is also cleared at the end of the IQ_RP Main Loop, which occurs after all actions have been processed. |
| 1 | The action for Rule "i" is in progress. For user I/F objects this means that the object has been rendered and is awaiting user input. The callbacks for each UIF (User Interface) object clear the "in progress" bit. The IQ_RP "action code block" sets this bit. |
| 2 | The action for Rule "i" has been completed. For user I/F objects this means that the object has been rendered, has received user input, the callback has been invoked and executed. The callbacks for each UIF (User Interface) object set this bit. |
| 3 | The user hit the "OK" or "APPLY" buttons for a UIF object. The "OK callbacks" set this bit. The OK Callbacks are StoreRuleData and okCallbackFunc |
| 4 | The user hit the "CANCEL" button for a UIF object. The "cancel callbacks" set this bit. The "cancel callbacks" are CancelCallback and CancelCallbackFunc. |

DS/DD Codes (Data Source & Destination Definitions)

Data Source & Destination Parameters

The number of data source & destination parameters required for a given rule depends upon the specific rule action code. Each action code is unique and may require more than one data source parameter. The data source parameter codes are listed in the table below. Note that scalars require 3 DS/DD parameters, vectors require 4 DS/DD parameters, 2D-arrays require 5 DS/DD parameters, etc. Also new DS/DD parameters may be defined and added at any time.

| DS/DD Code DSV(1), DDV(1) | Structure | Type | Class | Data Source/Destination Parameter Meaning |
|---|---|---|---|---|
| 0 | | | | None. Very important for rules that have no Data Source/Data Destination defined. |
| 1 | Scalar | I | Internal | Internal INTEGER data source. The data is within the RULE symbol itself, IL(DSV/DDV(2)); i.e., it is pointed to by DSV/DDV(2) |
| 2 | Scalar | R | Internal | Internal REAL data source. The data is within the RULE symbol itself, RL(DSV/DDV(2)); i.e., it is pointed to by DSV/DDV(2) |
| 3 | Scalar | C | Internal | Internal CHARACTER data source. The data is within the RULE symbol itself, TL(DSV/DDV(2)); i.e., it is pointed to by DSV/DDV(2) |
| 4 | Scalar | I | MADT | MADT INTEGER data source. MADT(DSV/DDV(2)).IVAL (global data area). The data is pointed to by DSV/DDV(2) |
| 5 | Scalar | R | MADT | MADT REAL data source. MADT(DSV/DDV(2)).RVAL (global data area). The data is pointed to by DSV/DDV(2) |
| 6 | Scalar | C | MADT | MADT CHARACTER data source. MADT(DSV/DDV(2)).CHAR (global data area). The data is pointed to by DSV/DDV(2) |
| 7 | Scalar | I | Scratch Pad | SP (Scratch Pad) INTEGER data source. SP(DSV/DDV(2)).IVAL (local data area). The data is pointed to by DSV/DDV(2) |
| 8 | Scalar | R | Scratch Pad | SP (Scratch Pad) REAL data source. SP(DSV/DDV(2)).RVAL (local data area). The data is pointed to by DSV/DDV(2) |

-continued

| DS/DD Code DSV(1), DDV(1) | Structure | Type | Class | Data Source/Destination Parameter Meaning |
|---|---|---|---|---|
| 9 | Scalar | C | Scratch Pad | SP (Scratch Pad) CHARACTER data source. SP(DSV/DDV(2)).CHAR (local data area). The data is pointed to by DSV/DDV(2) |
| 10 | Scalar | I | External | External object INTEGER data source. DSV/DDV(2) points to the symbol object and IL(DSV/DDV(3)) is the data item. |
| 11 | Scalar | R | External | External object REAL data source. DSV/DDV(2) points to the symbol object and RL(DSV/DDV(3)) is the data item. |
| 12 | Scalar | C | External | External object CHARACTER data source. DSV/DDV(2) points to the symbol object and TL(DSV/DDV(3)) is the data item. |
| 13 | Scalar | I | Oracle | Oracle INTEGER data source. Assemble SQL parameters to from SQL string and access the data item in the database. |
| 14 | Scalar | R | Oracle | Oracle REAL data source. Assemble SQL parameters to from SQL string and access the data item in the database. |
| 15 | Scalar | C | Oracle | Oracle CHARACTER data source. Assemble SQL parameters to from SQL string and access the data item in the database. |
| 16 | Scalar | I | User | "USER" INTEGER data source. Data item is supplied by the user through an interface object (e.g., Motif or wxWidgets) at run-time. |
| 17 | Scalar | R | User | "USER" REAL data source. Data item is supplied by the user through an interface object (e.g., Motif or wxWidgets) at run-time. |
| 18 | Scalar | C | User | "USER" CHARACTER data source. Data item is supplied by the user through an interface object (e.g., Motif or wxWidgets) at run-time. |
| 19 | Vector | I | Internal | Internal INTEGER vector data source. The data is within the RULE symbol itself. DSV/DDV(2) is the starting pointer so IL(DSV/DDV(2)) is the first element. DSV/DDV(3) is the number of vector elements/maximum number of elements. |
| 20 | Vector | R | Internal | Internal REAL vector data source. The data is within the RULE symbol itself. DSV/DDV(2) is the starting pointer so RL(DSV/DDV(2)) is the first element. DSVIDDV(3) is the number of vector elements/maximum number of elements. |
| 21 | Vector | C | Internal | Internal CHARACTER vector data source. The data is within the RULE symbol itself. DSV/DDV(2) is the starting pointer so TL(DSV/DDV(2)) is the first element. DSV/DDV(3) is the number of vector elements/ maximum number of elements. |
| 22 | Vector | I | MADT | MADT INTEGER vector data source. DSV/DDV(2) is the starting pointer so MADT(DSV/DDV(2)).IVAL is the first element. DSV/DDV(3) is the number of vector elements/ maximum number of elements. |
| 23 | Vector | R | MADT | MADT REAL vector data source. DSV/DDV(2) is the starting pointer so MADT(DSV/DDV(2)).RVAL is the first element. DSV/DDV(3) is the number of vector elements/ maximum number of elements. |
| 24 | Vector | C | MADT | MADT CHARACTER vector data source. DSV/DDV(2) is the starting pointer so MADT(DSV/DDV(2)).CVAL is the first element. DSV/DDV(3) is the number of vector elements/ maximum number of elements. |
| 25 | Vector | I | Scratch Pad | SP (Scratch Pad) INTEGER vector data source. DSV/DDV(2) is the starting pointer so SP(DSV/DDV(2)).IVAL is the first element. DSV/DDV(3) is the number of vector elements/ maximum number of elements. |
| 26 | Vector | R | Scratch Pad | SP (Scratch Pad) REAL vector data source. DSV/DDV(2) is the starting pointer so SP(DSV/DDV(2)).RVAL is the first element. DSV/DDV(3) is the number of vector elements/ maximum number of elements. |

-continued

| DS/DD Code DSV(1), DDV(1) | Structure | Type | Class | Data Source/Destination Parameter Meaning |
|---|---|---|---|---|
| 27 | Vector | C | Scratch Pad | SP (Scratch Pad) CHARACTER vector data source. DSV/DDV(2) is the starting pointer so SP(DSV/DDV(2)).CVAL is the first element. DSV/DDV(3) is the number of vector elements/maximum number of elements. |
| 28 | Vector | I | External | External object INTEGER vector data source. DSV/DDV(2) points to the symbol object and IL(DSV/DDV(3)) is the first data item. DSV/DDV(4) is the number of vector elements/maximum number of elements. |
| 29 | Vector | R | External | External object REAL vector data source. DSV/DDV(2) points to the symbol object and RL(DSV/DDV(3)) is the first data item. DSV/DDV(4) is the number of vector elements/maximum number of elements. |
| 30 | Vector | C | External | External object CHARACTER vector data source. DSV/DDV(2) points to the symbol object and TL(DSV/DDV(3)) is the first data item. DSV/DDV(4) is the number of vector elements/maximum number of elements. |
| 31 | Vector | I | Oracle | Oracle INTEGER vector data source. Assemble SQL string from from SQL substrings and access the data item in the database. DSV/DDV(2) is the number of vector elements/maximum number of elements. |
| 32 | Vector | R | Oracle | Oracle REAL vector data source. Assemble SQL parameters from SQL substrings and access the data item in the database. DSV/DDV(2) is the number of vector elements/maximum number of elements. |
| 33 | Vector | C | Oracle | Oracle CHARACTER vector data source. Assemble SQL parameters from the SQL substrings and access the data item in the database. DSV/DDV(2) is the number of vector elements/maximum number of elements. |
| 34 | Vector | I | User | "USER" INTEGER vector data source. Data item is supplied by the user through an interface object (e.g., Motif or wxWidgets) at run-time. DSV/DDV(2) is the number of vector elements requested. |
| 35 | Vector | R | User | "USER" REAL vector data source. Data item is supplied by the user through an interface object (e.g., Motif or wxWidgets) at run-time. DSV/DDV(2) is the number of vector elements requested. |
| 36 | Vector | C | User | "USER" CHARACTER vector data source. Data item is supplied by the user through an interface object (e.g., Motif or wxWidgets) at run-time. DSV/DDV(2) is the number of vector elements requested. |
| 37 | Vector | I | Widget | WIDGET INTEGER property value. DSV(2) points to the rule that created the Widget and TL(DSV(3)) is the widget property name. DSV(4) is the max number of items to return. Values of {negative, 0} mean return ALL values found. |
| 38 | Vector | R | Widget | WIDGET REAL property value. DSV(2) points to the rule that created the Widget and TL(DSV(3)) is the widget property name. DSV(4) is the max number of items to return. Values of {negative, 0} mean return ALL values found. |
| 39 | Vector | C | Widget | WIDGET CHARACTER property value. DSV(2) points to the rule that created the Widget and TL(DSV(3)) is the widget property name. DSV(4) is the max number of items to return. Values of {negative, 0} mean return ALL values found. |
| 40 | Scalar | I | Widget | WIDGET INTEGER property value_ DSV(2) points to the rule that created the Widget and TL(DSV(3)) is the widget property name. |
| 41 | Scalar | R | Widget | WIDGET REAL property value. DSV(2) points to the rule that created the Widget and TL(DSV(3)) is the widget property name. |

-continued

| DS/DD Code DSV(1), DDV(1) | Structure | Type | Class | Data Source/Destination Parameter Meaning |
|---|---|---|---|---|
| 42 | Scalar | C | Widget | WIDGET CHARACTER property value. DSV(2) points to the rule that created the Widget and TL(DSV(3)) is the widget property name. |
| 43-256 (Currently unused) | | | | |
| 257 | Scalar | I8 | Status | EVENT_FLAG. Set by IQ_RP. Indicates that an event has occurred. |
| 258 | Scalar | I8 | Status | EVENT_LOOP_CTR. Set by IQ_RP. Counts the number of times that the event-checking loop has been executed. |
| 259 | Scalar | I8 | Status | ACTION_LOOP_CTR. Set by IQ_RP. Counts the number of times that the action-execution loop has been executed. |
| 260 | Scalar | I8 | Status | MIN_INTERVAL. Calculated and set by IQ_RP_AST. The time interval in integer milliseconds until the next periodic event will occur. If there are no periodic events, then this value is set to 1000 ms = 1 second. This ensures that the maximum latency for new periodic events is 1.0 seconds. |
| 261 | Scalar | I8 | Status | OVMS_TIME. Set by IQ_RP_AST and IQ_AUDIT upon each entry to the subroutine. The current time in OVMS 64-bit format, which is the number of 100-nanosecond tics since 00:00 on Nov. 17, 1858 |
| 262 | Scalar | C23 | Status | OVMS_TIME_ASCII. Set by IQ_RP_AST and IQ_AUDIT upon each entry to the subroutine. The current time in 23-character ASCII format as show here: MMM-DD-YYYY HH:MI:SS.SS. |
| 263 | Vector | C128 10 entries | Status | SCREEN_NAME(*). Set by IQ_RP. This holds queue of the previous "x" screens that were displayed. DSV(2) is the starting point of the entry within this queue to be retrieved. DSV(3) is the number of elements of this queue to be retrieved. |
| 264 | Vector | C128 10 entries | Status | FILENAME(*). Set by IQ_RP. Holds queue of the previous "x" screen filenames that were displayed. DSV(2) is the starting point of the entry within this queue to be retrieved. DSV(3) is the number of elements of this queue to be retrieved. |
| 265 | Vector | C128 10 entries | Status | DIRECTORY(*). Set by IQ_RP. Holds queue of the previous "x" screen file directories that correspond to the displayed screen files. DSV(2) is the starting point of the entry within this queue to be retrieved. DSV(3) is the number of elements of this queue to be retrieved. |
| 266 | Vector | I8 10 entries | Status | RULE_LOC(*). Set by IQ_RP. Holds queue of the previous "x" rules executed. DSV(2) is the starting point of the entry within this queue to be retrieved. DSV(3) is the number of elements of this queue to be retrieved. |
| 267 | Vector | I8 10 entries | Status | RULE_ID(*). Set by IQ_RP. Holds queue of the previous "x" rules executed. DSV(2) is the starting point of the entry within this queue to be retrieved. DSV(3) is the number of elements of this queue to be retrieved. |
| 268 | Vector | I8 10 entries | Status | DB_ERROR(*). Set by IQ_DSDD. Holds queue of the previous "x" database access error codes. DSV(2) is the starting point of the entry within this queue to be retrieved. DSV(3) is the number of elements of this queue to be retrieved. |
| 269 | Vector | C4096 10 entries | Status | SQL_EXPANDED(*). Set by IQ_DSDD. Holds queue of the previous "x" SQL statements executed, with the special directives expanded/converted into literals. DSV(2) is the starting point of the entry within this queue to be retrieved. DSV(3) is the number of elements of this queue to be retrieved. |

-continued

| DS/DD Code DSV(1), DDV(1) | Structure | Type | Class | Data Source/Destination Parameter Meaning |
|---|---|---|---|---|
| 270 | Vector | C4096 10 entries | Status | SQL_CONTRACTED(*). Set by IQ_DSDD. Holds queue of the previous "x" SQL statements executed, with the special directives "as is"; i.e., NOT converted into literals. DSV(2) is the starting point of the entry within this queue to be retrieved. DSV(3) is the number of elements of this queue to be retrieved. |
| 271 | Vector | I8 10 entries | Status | X_MOUSE(*). Set by IQ_RP. Holds queue of previous "x" mouse click x-coordinates translated to "IQ-land" values. DSV(2) is the starting point of the entry within this queue to be retrieved. DSV(3) is the number of elements of this queue to be retrieved. |
| 272 | Vector | I8 10 entries | Status | Y_MOUSE(*). Set by IQ_RP. Holds queue of previous "x" mouse click x-coordinates translated to "IQ-land" values. DSV(2) is the starting point of the entry within this queue to be retrieved. DSV(3) is the number of elements of this queue to be retrieved. |
| 273 | Scalar | I8 | Status | OVMS_TIME_PREVIOUS. Set by IQ_RP_AST. The time returned by the PREVIOUS call to SYS$GETYTIM(*) in OVMS 64-bit format. |
| 274 | Scalar | I8 | Status | OVMS_LOOP_DURATION. Set by IQ_RP_AST. This is the current OVMS time − the previous OVMS time. It is in OVMS "delta" time format, which is always a negative 64-bit number. It represents the actual interval between successive calls to IQ_AST in 100 nsec "tics". This is different from MIN_INTERVAL which is when the next SCHEDULED periodic event will occur. |
| 275 | Scalar | R8 | Status | OVMS_LOOP_DURATION_SECONDS. Set by IQ_RP_AST. This is the OVMS_LOOP_DURATION converted to seconds expressed as a REAL number. This conversion is done by simple arithmetic: Duration (sec) = OVMS_LOOP_DURATION * −1.0e-7. |
| 276 | Scalar | C23 | Status | OVMS_LOOP_DURATION_ASCII. Set by IQ RP_ AST. The ASCII version of the above loop duration time. The conversion is done by the OVMS system call $ASCTIM(*). |
| 277 | Scalar | C64 | Status | USERNAME. The OVMS username <= 12 characters and is padded with spaces. |
| 278 | Scalar | C64 | Status | NODE_NAME. The node name where process IQ_RP is executing. |
| 279 | Scalar | C128 | Status | ACCESS_PORT_NAME. The port name through which user logged in. This item has four (4) possible interpretations: 1) If the terminal is on a terminal server, this item returns the terminal server name and the name of the line port on the terminal server. 2) If the terminal is A DECnet for OVMS remote terminal, this item returns the source system node name and the user name on the source system. 3) If the terminal is connected via TELNET, this item returns the originating host IP address and port. 4) If none of the above, this item returns a NULL string which consist of blanks in FORTRAN. |
| 280 | Scalar | C64 | Status | TERMINAL_NAME. The logical name of user's terminal (applies to local logins). |
| 281 | Scalar | C64 | Status | PHYSICAL_TERMINAL_NAME. The physical name of user's terminal (applies to local logins). |
| 282 | Scalar | C64 | Status | REMOTE_NODE_NAME. The node name of remote node (where user logged in from). |
| 283 | Scalar | C64 | Status | REMOTE_NODE_FULL_NAME. The "full" node name of remote node (where user logged in from). |
| 284 | Scalar | C64 | Status | REMOTE_ID. The "ID" of the remote user. Examples of this value are the following: 1) "BELOVICH(LOCAL)" - a local network connection via SSH or TELNET |

-continued

| DS/DD Code DSV(1), DDV(1) | Structure | Type | Class | Data Source/Destination Parameter Meaning |
|---|---|---|---|---|
| | | | | 2) "TELNET_C0A8FEF7" - a TELNET connection where the 8 hex digits are the IP address of the remote user.
3) "SSH_C0A8FEF7" - an SSH connection where the 8 hex digits are the IP address of the remote user.
4) "TELNET_XXXXXXXXYYYYYYYY" - a TELNET connection where the 16 hex digits are the IPV6 address of the remote user.
5) "SSH_XXXXXXXXYYYYYYYY" - an SSH connection where the 16 hex digits are the IPV6 address of the remote user. |
| 285 | Scalar | I8 | Status | PID. The 64-bit process ID, main "handle" for a process, also its load address in RAM |
| 286 | Scalar | I8 | Status | DEFAULT_PRIVILEGES. The 64-bit default process privileges, which is updated only upon each OVMS login |
| 287 | Scalar | I8 | Status | CURRENT_PRIVILEGES. The 64-bit current process privileges - may be dynamic because privileges may be altered while a process is running. |
| 288 | Scalar | I8 | Status | AUTHORIZED_PRIVILEGES. The 64-bit set of authorized process privileges - updated only upon OVMS login. |
| 289 | Scalar | I4 | Status | JOB_TYPE. Values from 0-5 => {detached, network, batch, local, dialup, remote}. |
| 290 | Scalar | I8 | Status | LOGIN_TIME. The user's login time in OVMS 64-bit format. |
| 291 | Scalar | C23 | Status | LOGIN_TIME_ASCII. The time of the last OVMS login in 23-character ASCII format. |
| 292 | Scalar | I4 | Status | STS_FLAGS. The process status flags - see $PCBDEF macro for BWS definitions. |
| 293 | Scalar | I4 | Status | STS2_FLAGS. The process status flags second 32-bit longword. |
| 294 | Scalar | I4 | Status | MODE. The process execution mode 0-3 = {other, network, batch, interactive}. |
| 295 | Scalar | I4 | Status | PAGE_CNT. The process page count in units of 512-byte pages. |
| 296 | Scalar | I4 | Status | GLOBAL_PAGE_CNT. The process global page count in units of 512-byte pages. |
| 297 | Scalar | I4 | Status | WSPEAK. The !peak working set size in units of 512-byte pages. |
| 298 | Scalar | I4 | Status | WSSIZE. The current working set size in units of 512-byte pages. |
| 299 | Scalar | I4 | Status | WSAUTH. The !authorized working set size in units of 512-byte pages. |
| 300 | Scalar | I8 | Status | UIF_TIME_PREVIOUS. The 64-bit OVMS time of the last UIF event before the current one, regardless of whether or not a rule is looking for it. |
| 301 | Scalar | I8 | Status | UIF_TIME. The 64-bit OVMS time of the last UIF event, regardless of whether or not a rule is looking for it. |
| 302 | Scalar | I8 | Status | UIF_INTERVAL. This is the time since the last UIF event. It is set to zero in IQ_RP whenever there is a UIF event. It is updated within IQ_RP_AST so that it correctly reflects the elapsed time since the last UIF event. Note that IQ_RP and IQ_RP_AST are the only two places that there is a call to SYS$GETTIM(*). UIF_INTERVAL is expressed as a 64-bit OVMS "delta time", which is always a negative number. |
| 303 | Scalar | I8 | Status | UIF_INTERVAL_SECONDS. This is the time since the last UIF event expressed as an R8 real number in seconds. |
| (future) | | | | |

SQL Statements & Special Directives

SQL strings are assembled at run-time to support fully dynamic database access of any kind. The SQL string is assembled from substrings, which can come from a variety of data sources. These different data sources constitute a different class of substring because the substring access is done differently depending upon the specific data source.

In many cases, it may be desirable to insert a value from another data source into the SQL statement. This may be accomplished by using a substring beginning with the @ character. The @ character is followed by a descriptor which determines which data class will be used. These substrings are called "special directives" (or pointers) because they tell the rule processor where to go to get the desired substring component of the SQL statement. This hierarchical, run-time assembly of SQL strings allows an unprecedented level of flexibility in database access and database control. It also facilitates rule creation because there is never a need for a "hard-coded" SQL string. Rather, all SQL strings are dynamic and dynamically-alterable so that one rule may perform, many different database accesses depending upon the needs at the moment that the rule is invoked.

Example special directive descriptors are INTL, MADT, SCRP, EXTL, STAT. Of course other special directive descriptors may be defined and added as requirements dictate. INTL refers to Internal, MADT refers to the MADT SCRP refers to the Scratch Pad, EXTL refers to an External Object, STAT refers to the set of internal Status Variables. The descriptor is then followed by the data type, enclosed in square brackets. [INT] refers to the integer data type, [REAL] refers to the real data type, and [CHAR] refers to the character data type. Finally, a number enclosed in square brackets determines which position in the data source will be used (equivalent to DS Value/Pointer above). EXTL requires a second number in square brackets (equivalent to DS Ext. Obj. Pointer). One of ordinary skill in the art will readily appreciate that additional classes may be added Example SQL Substring "Special Directives"

| Source | Meaning |
| --- | --- |
| @MADT[INT][1] | The SQL substring is the first integer item in the MADT |
| @SCRP[REAL][2] | The SQL substring is the second real item in the scratch pad |
| @INTL[CHAR][3] | The SQL substring is the third item in this rule symbol's Text List |
| @EXTL[CHAR][4][5] | The SQL substring is the fifth item in the Text List of the object at location #4 |
| @USER | The SQL substring is supplied at run-time by a user interface (UIF) device/widget. Only relevant for Data Destination SQLs. |
| @WIDG[TDB][x][y] | To be defined as of Mar. 9, 2009 by SGB & EWR. |
| @STAT[DBERR][1] | The SQL substring is the latest (i.e., the topmost or the first) entry in the status variable DB_ERROR(*) array, SV.DB_ERROR(1). |
| @STAT[XMS][2] | The SQL substring is the second most recent X-coordinate received from pushing the left mouse button in the IQ_RP main window. |
| @STAT[YMS][1] | The SQL substring is the most recent Y-coordinate received from pushing the left mouse button in the IQ_RP main window. |

The Rule Processor

IQ_RP.FOR is the source file for the rule processor. IQ_RP.COM is the "make file" which is a DCL command procedure that links IQ_RP with all of its component routines as well as the Oracle database.

IQ_RP reads screen files (.BXB) which contain BVC_GRAPHICS symbols. The RULE__1 symbol is the carrier for the rule parameters. One RULE__1 symbol equals one rule. Each rule is characterized by various classes of parameters, as described in the preceding chapter. The RULE__1 symbol is configured within IQ_BILD which uses the subroutine IQ_BILD_RULE to setup events-actions for each rule.

Upon launch, IQ_RP initializes the communication with the client via the XLIB protocol, initiating an "X-session". IQ_RP opens the startup screen file (*.BXB) file and implements the rules contained therein. This startup screen file contains rules that establish global parameters that are deployment-specific.

"Threaded into" IQ_RP's event checking is the use of the XLIB event queue for user events. IQ_RP looks for both user-defined events (through the RULE symbol) and XLIB user I/F events, which appear on the event queue.

Referring to FIG. 13, IQ_RP is planar code (which also implies plainer code) in that its flowchart can be drawn without any crossing lines. IQ_RP consists of two main loops, the "Event Loop" (EL) and the "Action Loop" (AL). The event loop looks for events which are either user interface activities (UIF events) or events defined by the set of rules being executed. The event loop tests for these events and flags those events that have occurred.

Between the event loop and the action loop is the AUDIT section and the security/Operating System (O/S) Permissions section. The AUDIT section performs any and all requested auditing of events and their corresponding action(s). The security/O/S Permissions section ensures that the rule has the proper authorization to do what it is requesting to do. Note that the security is enforced at the lowest level of the O/S, which is why a DoD-rate Trusted Computing Base (TCB) is preferred for the server for proper security.

The planar (and plainer) architecture of the Rule Processor and the insertion of audit and security enforcement between the event and action loops allows an arbitrary level of granularity for both auditing and security enforcement. When application requirements change due to business demands or changes in the regulatory landscape, this rule-based architecture ensures that rules may be easily altered or added to comply with such changes.

The user interface ("UIF") of the rule processor can be based "XLIB", originally developed by MIT. Both XLIB and XT (the so-called "intrinsics") may be used within IQ_RP for UIF handling. The user interface objects (called "widgets") are based upon "Motif". These objects and the various Motif library routines handle UIF events and render any and all UIF objects such as widgets and gadgets.

By way of background, Xlib does not provide support for buttons, menus, scrollbar, etc. Such widgets are provided by other libraries, which in turn use Xlib. Currently there may be two kinds of such libraries: (a) Libraries built atop of the Intrinsics library (Xt), which provides support for widgets but does not provide any particular widget; specific widgets are provided by widget set libraries that use Xt, such as Xaw and Motif; and (b) Libraries that provide widget sets using Xlib directly, without the Xt library, such as GTK+, Qt (X11 version), and FLTK (X11 version).

Applications using any of these widget libraries typically specify the content of the window before entering the main loop and do not need to explicitly handle Expose events and redraw the window content. Note that the XCB library is an alternative to Xlib. Its two main aims are: reduction in library size and direct access to the X11 protocol. A modification of Xlib has been produced to use XCB as a low-level layer.

IQ_RP's Event Loop

The "event loop" within IQ_RP looks for XLIB events (or UIF events) and for "rule configured" events, which are configured through IQ_BILD. Within the event loop, XtAppNextEvent is called to get events off of the XLIB-maintained event queue. Since this call will block if there are no XLIB events, the "event loop" in IQ_RP is only executed under the following conditions: (a) there are no outstanding rule-configured events; or (b) there are events pending on the queue that are actual X-events (XtIMXEvent< >0=TRUE) rather than timer events or other kinds of events.

Auditing

IQ_RP can audit each event and action, if desired. When required, event-action auditing occurs in between the event loop and the action loop of IQ_RP. Each event that occurs (so-called "flagged" events) may be individually audited, if so configured.

The purpose of auditing is to reconstruct a sequence of events whenever required for detailed analysis. Auditing needs to record enough information to support this process in a trustworthy way. Auditing also has to be as non-invasive as possible for speed and storage considerations. The bulk of the effort on auditing is intended to be "off-line" where the reporting effort extracts the requested information from that data stored in the audit data table.

IQ_RP is a generic rule processor that can operate as a secure data management & analysis application. Hence, IQ_RP is "blind" with respect to the details of the application it is operating as. This means that such associations must be done via configuration using IQ_BILD/IQ_BILD2 so that the audit information that is relevant to the specific application will be recorded as part of the audit process.

Regardless of the audit process, there are items that will always be part of an audit trail. Examples of such information are the current username (UID), user privileges, etc. The AUDIT table will have fields dedicated to these items.

These items are referenced in the same way as DS and DD items. IQ_DSDD resolves these items to literal values at run-time. IQ_BILD/IQ_BILD2 is used to specify these audit items when the rules are configured.

Audit Concepts & Control Mechanisms

Auditing is controlled by global audit variables within the "state variable" section of IQ_RP. Auditing is also controlled via the setting of each rule's audit parameters. There is one audit table for storing all of the audited data. The routine IQ_AUDIT.FOR handles all auditing operations.

Because the IQ_RP is generic, the AUDIT table field names should be generic as well. The meanings of such generic AUDIT table fields, however, are a function of the specific "rule system" (i.e., the specific deployment) that is being deployed. It is up to the rule configurator to specify what these AUDIT table fields mean and to keep those meanings consistent throughout the deployment.

One mechanism is the setting of the AUDIT_BWS "state variable" within IQ_RP. This global state variable controls the auditing "on-the-fly" and so "trumps" the setting of individual rules in the direction of "AUDIT" versus "Do Not Audit".

The other audit control mechanism is the setting of the audit parameters for each individual rule. IQ_BILD can configure each RULE_1 symbol so that IQ_RP will audit the event-action pair to the a different degree of detail. This feature provides a nearly infinite event-action audit capability. The granularity of the audit capability is down to the lowest level of user interface activity, including mouse clicks, button motions, etc.

The other audit control mechanism is the setting of the audit parameters for each individual rule. These parameters control what to audit for that particular rule and are not applied to other rules.

Auditing is done in three places. The first place is after the event loop. When an event occurs that should be audited (either via a global directive or a rule configuration), a new record is inserted into the audit data table (table name ADT) with the time, the event and other relevant parameters. A SQL INSERT statement may be used to do this.

The second place auditing occurs is after an action is completed that corresponds to the audited event. A SQL UPDATE statement may be used to update the existing ADT record with the action completion time and other relevant parameters, such as the DS or DD strings that describe what data item(s) was (were) affected.

The third place auditing occurs is after the callback for a UIF device. UIF devices require user input which can take a long time. Once that input is received, the callback completes the action by storing the user data via the StoreRuleData callback (which calls IQ_DSDD). Once this is stored, the action is audited via an UPDATE SQL statement.

The exemplary networks have been relatively simple to ease comprehension but much larger more complicated networks are possible. Additionally, the examples set forth herein are not mutually exclusive. Thus, combinations and sub-combinations of components of each are within the spirit of the disclosure. The application has been described with reference to several exemplary embodiments. Potential modifications and alterations will occur to others upon a reading and understanding of the specification. It is intended that the invention be construed as including all such modifications and alterations insofar as they come within the scope of the append claims or the equivalents thereof.

What is claimed is:

1. A machine in data communication with at least one remote computing device configured at least as a user interface, the machine comprising:

Storage containing non-compiled, non-linked rules each relating at least one of a plurality of events to at least one associated action;

First logic configured for monitoring the non-compiled, non-linked rules, where monitoring the non-compiled and non-linked rules includes checking for an event, taking an action associated with the event, and auditing the event and action, where the monitoring provides desired functionality on the at least one remote computing device upon an event; and Second logic configured to selectively implement an authorized rule change changing a non-compiled, non-linked rule and storing the changed rule in storage, where changing the non-compiled, non-linked rule is done in run-time and provides changed functionality on the at least one remote computing device upon an event, where the changed functionality corresponds to the authorized rule change when processed by the first logic.

2. The machine as set forth in claim 1, where the first logic comprises a reference monitor.

3. The machine as set forth in claim 1, where the first logic comprises planar software code.

4. The machine as set forth in claim 3, where the first logic comprises an event loop and an action loop.

5. The machine as set forth in claim 4, where the first logic comprises an audit process between the event loop and the action loop.

6. The machine as set forth in claim 1, where the rules include display.

7. The machine as set forth in claim 1, where the rules include database operations.

8. The machine as set forth in claim 1, where the rules include data analysis.

9. The machine as set forth in claim 1, where the rules include data acquisition.

10. The machine as set forth in claim 1, where the rules include data transfer.

11. The machine as set forth in claim 1, where the rules include report preparation.

12. The machine as set forth in claim 1, where the events include mouse click.

13. The machine as set forth in claim 1, where the events include key press.

14. The machine as set forth in claim 1, where the events include a comparison operation.

15. The machine as set forth in claim 1, where the events include count-down timers.

16. A server in data communication with at least one client configured at least as a user interface, the server comprising:
   Storage containing non-compiled, non-linked rules each relating one of a plurality of events to an associated action;
   First logic configured for processing rules without compiling the rules, where processing the rules includes: monitoring the rules by checking for an event, taking an action associated with the event, and auditing the event and action, providing desired system functionality;
   Second logic configured to selectively implement an authorized rule change and store the authorized rule change in storage, where processing the authorized rule change is done in run-time and provides changed system functionality based on the authorized rule change; and
   Input logic configured for receiving data communication from the client initiating an event.

17. The server as set forth in claim 16, where the first logic comprises a reference monitor.

18. The server as set forth in claim 16, where the first logic comprises an event loop and an action loop.

19. A client-server system comprising:
   A client computing device configured at least as a user interface; and
   A server comprising:
      storage containing non-compiled, non-linked rules each relating at least one of a plurality of events to at least one associated action;
      first logic configured for monitoring the non-compiled, non-linked rules, where monitoring the rules includes checking for an event, taking an action associated with the event by a rule, and auditing the event and action, where the event, action and audit provide desired system functionality;
      second logic configured to selectively implement an authorized rule change and store the authorized rule change in storage, where processing the authorized rule change is done in run-time and provides changed system functionality based on the authorized rule change;
      input logic configured for receiving data communication from the client; and
      output logic configured for data communication to the client.

20. The client-server system as set forth in claim 19, where the first logic comprises an event loop and an action loop and an audit process between the event loop and the action loop.

* * * * *